United States Patent [19]

Kanner et al.

[11] 4,110,271

[45] Aug. 29, 1978

[54] FORMATION OF POLYURETHANE FOAM IN THE PRESENCE OF SULFOLANYL-BEARING POLYSILOXANE-POLYOXYALKYLENE POLYMERS

[75] Inventors: Bernard Kanner, West Nyack; Bela Prokai, Mahopac, both of N.Y.

[73] Assignee: Union Carbide Corporation, New York, N.Y.

[21] Appl. No.: 800,891

[22] Filed: May 26, 1977

Related U.S. Application Data

[62] Division of Ser. No. 592,129, Jun. 30, 1975, Pat. No. 4,049,674.

[51] Int. Cl.$^2$ .................... C08K 5/54; C08G 18/42; C08G 18/48
[52] U.S. Cl. .................................... 521/111; 521/906
[58] Field of Search .................. 260/2.5 AH, 2.5 AJ

[56] References Cited

U.S. PATENT DOCUMENTS

| | | | |
|---|---|---|---|
| 2,833,801 | 5/1958 | Holbrook | 260/448.2 |
| 3,325,439 | 6/1967 | Steinbach | 260/448.2 S |
| 3,457,290 | 7/1969 | Selin | 260/448.2 S |
| 3,846,462 | 11/1974 | Prokai | 260/448.2 H |
| 4,049,674 | 9/1977 | Kanner | 260/2.5 AH |
| 4,049,675 | 9/1977 | Kanner | 260/2.5 AH |

OTHER PUBLICATIONS

Cooper, G. D., *Journal of American Chemical Society,* vol. 76, pp. 3713–3716, (1954).

*Primary Examiner*—C. Warren Ivy
*Attorney, Agent, or Firm*—Marylin Klosty

[57] ABSTRACT

The formation of polyurethane foam including flame-retarded foam is provided employing, as the surfactant component of the foam formulation, a particular class of sulfolanyloxyalkyl-substituted polysiloxane-polyoxyalkylene polymers. The polymers comprise chemically combined monofunctional siloxy units ($M_o$) and difunctional siloxy units ($D_o$) and, for every two moles of $M_o$, an average of from about 2 to about 100 silicon-bonded sulfolanyloxyalkyl groups (Q) and an average of from about 2 to about 30 silicon-bonded polyoxyalkylene blocks (E). The $M_o$ units have at least two alkyls bonded to the respective silicon atoms thereof and the $D_o$ units have at least one alkyl bonded to the respective silicon atoms thereof, the remaining group bonded to silicon of said $M_o$ and $D_o$ units being alkyl, Q or E. When the polyol reactant of the foam formulation is a polyether polyol, the polymers contain from 10 to 200 dialkylsiloxy units and from 2 to 100 Q groups, and the polyoxyalkylene content of E is constituted of from 20 to 75 weight percent oxyethlene. When the polyol reactant is a polyester polyol, the polymers contain zero or up to 20 dialkylsiloxy units and from 2 to 20 Q groups, and the polyoxyalkylene content of E is constituted of at least 75 weight percent oxyethylene.

10 Claims, No Drawings

FORMATION OF POLYURETHANE FOAM IN THE PRESENCE OF SULFOLANYL-BEARING POLYSILOXANE-POLYOXYALKYLENE POLYMERS

This application is a division of our prior and copending application Ser. No. 592,129, filed June 30, 1975, now U.S. Pat. No. 4,049,674.

BACKGROUND OF THE INVENTION

The present invention relates to a particular novel class of substituted polysiloxane hydrides and correspondingly substituted polysiloxane-polyoxyalkylene copolymers, the utility of the hydrides such as in forming said copolymers, and to the use of the copolymers in the formation of cellular urethane products, particularly flexible urethane foam containing a flame-retardant.

It is well known that the urethane linkages of cellular urethanes are formed by the exothermic reaction of a polyfunctional isocyanate and a polyfunctional active hydrogen-containing compound in the presence of a catalyst, and that the cellular structure is provided by gas evolution and expansion during the urethane-forming reaction. Illustrative of suitable active hydrogen-containing compounds are polyether polyols and polyester polyols. In accordance with the "one-shot" process which is the most widely used industrial technique, direct reaction is effected between all of the raw materials which include the polyisocyanate, the active hydrogen-containing compound, the catalyst system, blowing agent and surfactant. A major function of the surfactant is to stabilize the urethane foam, that is, prevent collapse of the foam until the foamed product has developed sufficient gel strength to become self-supporting. Among the various types of silicon-containing compositions reported in the literature as effective stabilizers or urethane foam derived from a polyester polyol and a polyether polyol are those described in U.S. Pat. Nos. 3,594,334 and Re. 27,541, respectively. From the standpoint of potency and quality of foam product, especially effective foam stabilizers described in these patents are those in which silicon of the siloxane portion of the respective copolymer components is substituted with methyl groups only.

In recent years considerable effort has been expended and continues, to reduce the recognized objectionable characteristic of urethane polymers in their ability to ignite readily and burn with an open flame. One approach to this problem is to include a flame-retarding agent such as various phosphorus and/or halogen-containing compounds as a component of the foam-producing reaction mixture, and in this respect, to develop improved and more efficient flame-retarding agents. As associated problem is to provide surfactants which not only function to stabilize foam containing a flame-retardant but which also allow for the formation of such foam which burns at a reduced rate relative to surfactants designed for stabilization of non flame-retarded foam. For example, the polymethylsiloxanepolyoxyalkylene copolymers described in the aforementioned patents are excellent stabilizers of non flame-retarded and are also capable of stabilizing foam containing a flame-retardant. However, the flammability properties of the resulting foam products appear to indicate an adverse effect of the surfactant on the efficiency of the flame-retarding agent.

It is desirable, therefore, and is a principal object of this invention to provide a new class of polysiloxane-polyoxyalkylene copolymers which, in addition to the ability to stabilize non flame-retarded cellular urethanes, offer particular utility as stabilizers of foam having a flame-retardant incorporated therein.

Various other objects and advantages of this invention will become apparent to those skilled in the art from the accompanying description and disclosure.

SUMMARY OF THE INVENTION

In accordance with one aspect of the present invention particular sulfolanyloxyalkyl-modified organosilicone polymers are provided which contain chemically combined monofunctional siloxy units ($M_o$) and difunctional siloxy units ($D_o$) and, for every two moles of monofunctional units ($M_o$) contained in the polymer, an average of from about two to about 100 silicon-bonded sulfolanyloxyalkyl groups (Q) and an average of from about 2 to about 30 silicon-bonded E° groups where E° is a polyoxyalkylene block (E) or a hydrogen atom. The essential silicon-bonded sulfolanyloxyalkyl group, which is referred to herein by the symbol "Q," has the formula,

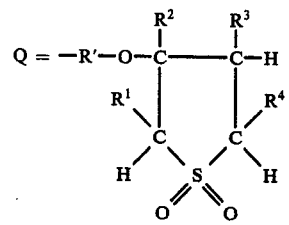

where: R' is bivalent alkylene having from two to eight carbon atoms; and $R^1$, $R^2$, $R^3$ and $R^4$ shown bonded to the carbon atoms in the two to five positions of the ring, respectively, are independently hydrogen or alkyl having from one to four carbon atoms.

In the monofunctional siloxy units encompassed by $M_o$ of the polymers of the invention, the respective silicon atoms are bonded to two alkyl groups (R), the third silicon-bonded group being the aforesaid sulfolanyl-bearing group (Q), an alkyl group (R) or E° (that is, the polyoxyalkylene block, E, or hydrogen). Thus, included within the scope of $M_o$ are monofunctional siloxy units having the following unit formulae which for brevity are also individually referred to herein as the M, M', M'' and M° units as shown:

M = $(R)_3SiO_{1/2}$
M' = $(E)(R)_2SiO_{1/2}$
M'' = $(Q)(R)_2SiO_{1/2}$
M° = $(H)(R)_2SiO_{1/2}$

In any given polymer composition of the present invention, the $M_o$ units may be the same as or different from one another. In the difunctional siloxy units encompassed by $D_o$, at least one of the two groups bonded to the respective silicon atoms is alkyl and the second silicon-bonded group is Q, E° or R. Thus, included within the scope of $D_o$ are difunctional units having the following unit formulae which, for brevity, are also individually referred to herein as the X, Y, Z and Z° units, as shown:

X = $(R)_2SiO_{2/2}$
Y = $(Q)(R)SiO_{2/2}$
Z = $(E)(R)SiO_{2/2}$
Z° = $(H)(R)SiO_{2/2}$

The polymers of the invention may contain any combination or subcombination of the respective siloxy units within the scope of $M_o$ and $D_o$ provided an average of from about two to about 100 sulfolanyl-bearing groups (Q) and from about 2 to about 30 E° groups are present.

When E° is the polyoxyalkylene block, E, the polymers of the invention comprise sulfolanyloxyalkyl-substituted polyalkylsiloxane-polyoxyalkylene copolymers and, when E° is hydrogen, the polymers of the invention comprise sulfolanyloxyalkyl-substituted polyalkylsiloxane hydrides. The average composition of said copolymers and hydrides is as defined by the following Formula I,

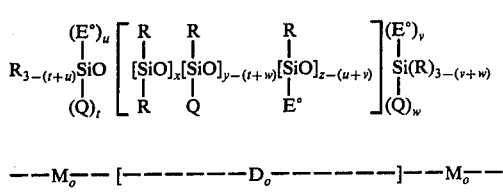

$$--M_o--[--------D_o--------]--M_o--$$

wherein: Q is sulfolanyloxyalkyl; E° is the polyoxyalkylene block, E, or hydrogen, R is alkyl, each of $t, u, v, w$, the sum $t+u$ and the sum $v+w$ independently has a value of zero or one; each of the sums $t+w$ and $u+v$ has a value of zero, one or two, it being evident that the value of the sum $t+u+v+w$ is also zero, one or two; $x$ is zero or any positive number having an average value up to about 200; $y$ has an average value from about 2 to about 100; and $z$ has an average value from about 2 to about 30. It is evident from Formula I that $x$, $y-(t+w)$ and $z-(u+v)$ designate the average number of moles of the respective difunctional X, Y and Z (when E° is E) or Z° (when E is hydrogen) units contained in the polymers for every two moles of total monofunctional units ($M_o$) as shown, and that the values of $y$ and $z$ correspond to the total number of Q and E° groups, respectively, contained in the polymer. Further, when $t+w$ is zero, $y$ also corresponds to the total number of difunctional Y units contained in the polymer for every two moles of total monofunctional units ($M_o$). Likewise, when $u+v$ is zero, $z$ corresponds to the total number of difunctional Z or Z° units which are present for every two moles of $M_o$.

The sulfolanyloxyalkyl-substituted polyalkylsiloxane hydrides described herein are useful as wetting agents, anti-static agents, textile finishes and are especially useful in forming a variety of organosilicone polymers by hydrosilation and hydrogen condensation reactions. For example, the polymers encompassed by Formula I wherein E° is hydrogen are reactive with polyoxyalkylene ethers which at one end are endblocked with a monoolefinic group or are hydroxyl-terminated, to form the corresponding sulfolanyloxyalkyl-substituted polyalkylsiloxane-polyoxyalkylene copolymers of the invention, that is, the compositions defined by Formula I wherein E° is a polyoxyalkylene block (E). The copolymers, in turn, are useful as surfactant-providing compositions finding particular application in the manufacture of cellular urethane products, including urethane foam produced with a flame-retardant.

In accordance with another aspect of the present invention, there is provided a process for producing polyurethane foam which comprises reacting and foaming a reaction mixture of: (a) an organic polyol reactant comprising a polyether polyol or a polyester polyol containing an average of at least two hydroxyl groups per molecule; (b) a polyisocyanate reactant containing at least two isocyanato groups per molecule; (c) a blowing agent; (d) a catalyst comprising a tertiary-amine; and (e) a foam stabilizing component comprising the sulfolanyloxyalkyl-substituted organosiloxane-polyoxyalkylene copolymers of the present invention. In addition to their efficacy as stabilizers of non flame-retarded urethane foam, it has been found that the copolymers described herein possess the further advantageous property of allowing for the formation of flame-retardant containing foam of acceptable overall quality, and reduced combustibility relative to unmodified polyalkylsiloxane-polyoxyalkylene copolymers. In accordance with this aspect of the present invention, flame-retardant containing polyether-based and polyester-based urethane foam products are provided by reacting and foaming respective reaction mixtures which additionally include a flame-retarding agent.

In providing the polyurethane foams of the invention, the sulfolanyloxyalkyl-substituted organosiloxane-polyoxyalkylene copolymers can be introduced to the foam producing reaction mixtures either as such, as a blend with various organic additives including organic surfactants, or in combination with one or more of the polyol reactant, blowing agent, amine catalyst and, when used, the flame-retarding agent.

DETAILED DESCRIPTION OF THE INVENTION AND PREFERRED EMBODIMENTS

The functionality of the respective types of structural units encompassed by $M_o$ and $D_o$ of the polymers of this invention denotes the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si—O—Si'— bonds. Accordingly, in expressing the individual formulas of the respective units of the polymers of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another silicon atom. In view of their monofunctionality, the $M_o$ units are chain terminating or endblocking units and the respective oxygen atoms thereof are shared with silicon of one other unit which can be Y, Z or Z° and, when present, X. On the other hand, X, Y, Z and Z° are difunctional and thus the respective two oxygen atoms associated with each silicon atom thereof are shared with respective silicon atoms of other units. Thus, the reoccurring difunctional units may be distributed in the polymer randomly, alternately, as sub-blocks of repeating units of the same type, or in any combination of such arrangements. Further, the polymers of the invention comprise mixtures of polymer species which differ in molecular weight, total polyoxyalkylene or silanic hydrogen content, total siloxane content, and in the type, arrangement and relative proportions of units. Therefore, as expressed herein, the parameters employed to denote these variables are average values and are based on the relative proportions of reactants from which the various units are derived. It is to be further understood that, consistent with convention in the art to which the present invention pertains, as expressed herein, the formulas of the polymers indicate their overall average empirical composition rather than any particular ordered arrangement of units or molecular weight of any particular polymer species. With this understanding, the average composition of the respective types of polymers encompassed by Formula I above may be expressed by the following formulae wherein the various siloxy units, as in Formula I, are shown in chemically combined form:

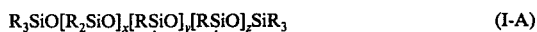  (I-A)

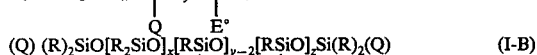  (I-B)

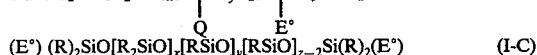  (I-C)

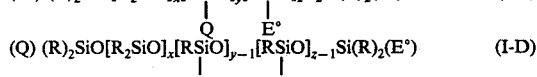  (I-D)

wherein: R, Q, E°, x, y and z are as above defined.

The silicon-bonded R groups are alkyls having from one to ten carbon atoms including linear and branched alkyls. Illustrative of suitable groups encompassed by R are: methyl, ethyl, n-propyl, isopropyl, n-butyl, t-butyl, pentyl, hexyl, octyl and decyl. Of the various groups represented by R, the lower alkyls (that is, those having from one to four carbon atoms) are preferred of which methyl is especially suitable. It is to be understood that the R groups may be the same throughout the polymers or they may differ as between or within units without departing from the scope of this invention. For example, when the endblocking monofunctional units are M, that is, $R_3SiO_{1/2}$—, they may be trimethylsiloxy units and the difunctional units, $R_2SiO_{2/2}$, when present, may be diethylsiloxy and/or methylethylsiloxy units.

In the Q substituents of the siloxane portion of the polymers of this invention, that is, in

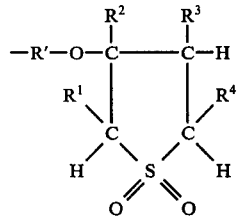

the $R^1$ through $R^4$ groups are, as previously defined, hydrogen or $C_1$ to $C_4$ alkyls. Usually, no more than two are alkyls as in the 2,4-dimethylsulfolan-3-yloxyalkyl nucleus. Preferably, each of $R^1$, $R^2$, $R^3$ and $R^4$ is hydrogen. The R' group of Q is a bivalent alkylene radical including linear and branched radicals, of the series, —$C_cH_{2c}$—, where c is an integer having a value from two to eight. Illustrative of the linear and branched saturated bivalent alkylene radicals encompassed by —R'— are the following where the valence of the carbon atom designated in the one position is satisfied by a bond to silicon of the Y and/or M" units, the other valence of —R'— being satisfied by the bond to oxygen of the sulfolanyloxy group of Q: ethylene; 1,3-propylene or trimethylene; 1,2-propylene; 2-methyl-1,3-propylene; 1-methyl-1,3-propylene; 1-ethylethylene; 1,4-butylene or tetramethylene; 3-methyl-1,3-propylene; 3-ethyl-1,3-propylene; 1,5-pentylene or pentamethylene; 4-methyl-1,4-butylene; 1,6-hexylene or hexamethylene; 1-methyl-3,3-dimethyl-1,3-propylene; 1-ethyl-2,2-dimethyl-ethylene; 4,4-dimethyl-1,4-butylene; 3-propyl-1,3-propylene; 1-ethyl-1,4-butylene; 1-propyl-1,3-propylene; 1,8-octylene or octamethylene; and the like. Preferably, —R'— has from 2 to 6 carbon atoms and most preferably has three or four carbon atoms.

Illustrative of the Y units [(Q)(R)SiO_{2/2}] of the sulfolanyloxyalkyl-modified polyalkylsiloxane hydrides and sulfolanyloxyalkyl-modified polyalkylsiloxane-polyoxyalkylene copolymers described herein are the following:

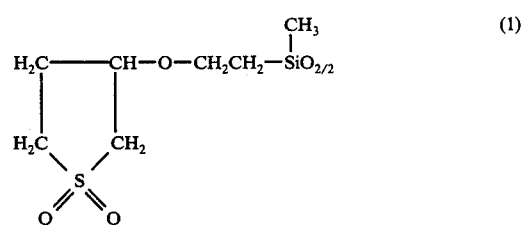 (1)

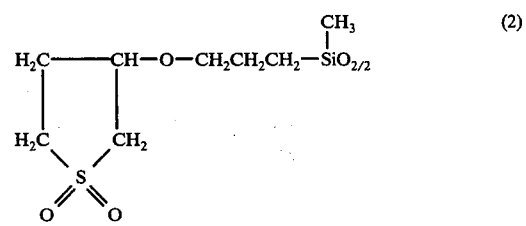 (2)

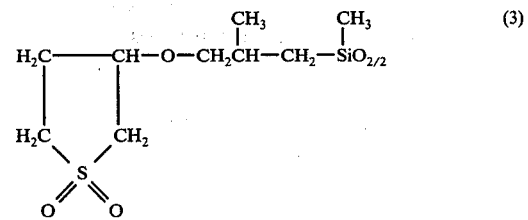 (3)

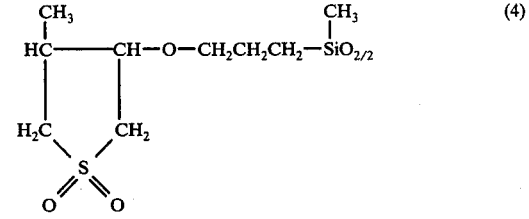 (4)

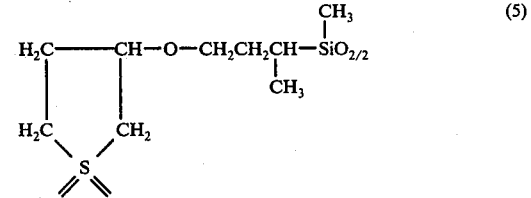 (5)

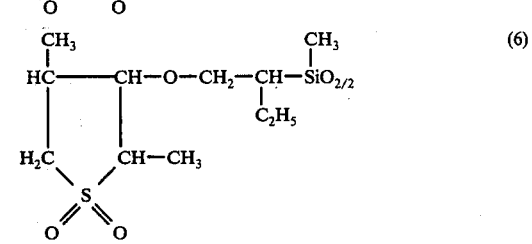 (6)

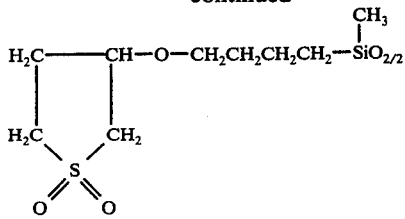

(7)

and corresponding units in which the silicon-bonded methyl group is ethyl, propyl, butyl, and the like. It is to be understood that the polymers of this invention may contain any one of the various Y units illustrated by the above as essentially the sole type of Q-modified difunctional unit or the polymers may comprise any combination thereof.

Illustrative of the Q-modified monofunctional units (M''') are corresponding sulfolanyloxyalkyl dialkylsiloxy units such as: sulfolan-3-yloxyethyl dimethylsiloxy wherein Q is as in (1) above; 3-(sulfolan-3-yloxy)propyl dimethylsiloxy wherein Q is as in (2) above; 2-methyl-3-(sulfolan-3-yloxy)propyl dimethylsiloxy wherein Q is as in (3) above; 3-(4-methyl-sulfolan-3-yloxy)propyl dimethylsiloxy wherein Q is as in (4) above; 1-methyl-3-(sulfolan-3-yloxy)propyl dimethylsiloxy wherein Q is as in (5) above; 1-(2,4-dimethyl-sulfolan-3-yloxy)ethyl dimethylsiloxy wherein Q is as in (6) above; and 4-(sulfolan-3-yloxy)butyl dimethylsiloxy wherein Q is as in (7) above.

When E° of Formula I and Formulas I-A through I-D is hydrogen, the polymers of the invention are sulfolanyloxyalkyl-substituted polyalkylsiloxane hydrides containing the aforementioned Z° and/or M° units and thus have the following respective average compositions,

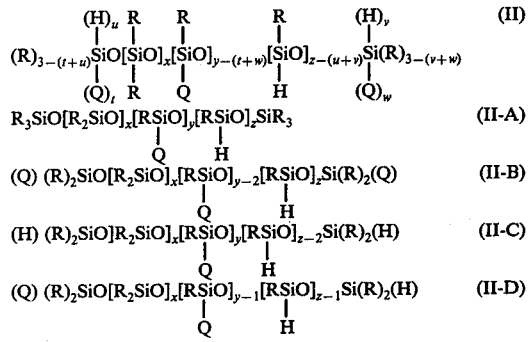

wherein: Q is the above-described sulfolanyloxyalkyl group; R is alkyl of one to ten carbon atoms; x is zero or a positive number having an average value up to about 200; y has an average value from about 2 to about 100; z has an average value from about 2 to about 30; and, in Formula II, t, u, v, w, the sum t+u and the sum v+w are independently zero or one, and each of the sums t+w and u+v is independently zero, one or two.

When E° of Formula I and Formulas I-A through I-D is a polyoxyalkylene block (E), the polymers of the invention are sulfolanyloxyalkyl-substituted polyalkylsiloxane-polyoxyalkylene copolymers containing the aforementioned Z and/or M' units and thus have the following respective average compositions,

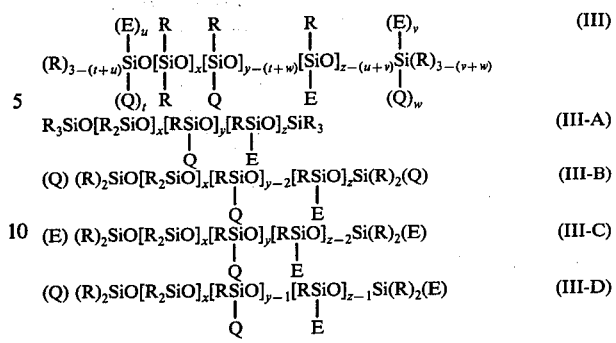

wherein: Q is the above-described sulfolanyloxyalkyl group; R is alkyl of one to 10 carbon atoms; x is zero or a positive number having an average value up to about 200; y has an average value from about 2 to about 100; z has an average value from about 2 to about 30; in Formula III, t, u, v, w, the sum t+u and the sum v+w are independently zero or one, and each of the sums t+w and u+v is independently zero, one or two; and E in each occurrence is a polyoxyalkylene block.

The average composition of the preferred polyoxyalkylene blocks (E) of the Z and M' units of the copolymers described herein is,

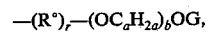

—(R°)ᵣ—(OCₐH₂ₐ)ᵦOG, wherein: r is zero or one; —R°— comprises a bivalent alkylene group a carbon atom of which is bonded to silicon; —(OCₐH₂ₐ)ᵦ— represents a polyoxyalkylene chain, a having a value from 2 to 4 and b having an average value from about 3 to about 100. Usually, at least 20 weight percent of the polyoxyalkylene chain is constituted of oxyethylene. The particular composition of the polyoxyalkylene chain depends on the desired end use application of the sulfolanyloxyalkyl-modified copolymers described herein, as discussed in greater detail hereinbelow.

When present, the linking group (—R°—) between silicon and that portion of the polyoxyalkylene block (E) shown as —(OCₐH₂ₐ)ᵦOG, is a bivalent alkylene group, an -alkylene—C(O)— group or an -alkylene-NH—C(O)— group wherein the free valence of alkylene of the latter two groups is bonded to silicon. In these linking groups, alkylene has the more specific formula, —CₑH₂ₑ—, where e has a value from 2 to 6 and is usually no more than four. Illustrative of suitable groups encompassed by R° are: ethylene, trimethylene, 1,2-propylene, tetramethylene, hexamethylene; corresponding —CₑH₂ₑ—C(O)— groups which together with oxygen of the polyoxyalkylene chain form an ester linkage; and corresponding —CₑH₂ₑ—NH—C(O)— groups which in combination with oxygen of the polyoxyalkylene chain form carbamate linkages.

As further indicated by the formula of the polyoxyalkylene blocks (E) of the Z and M' units, the poly(oxyalkylene) chain is terminated by the organic group, GO—, wherein G is a monovalent organic capping group. Illustrative of the organic caps encompassed by G are such groups as: R°°—, R°°NHC(O)—, and R°°C(O)—, wherein R°° is a monovalent hydrocarbon radical having from 1 to 12 carbon atoms, and is usually free of aliphatic unsaturation. The groups (GO—) which endblock the polyoxyalkylene chains are, therefore, corresponding R°°O—, R°°NHC(O)O— and R°°C(O)O— monovalent organic radicals. In the aforesaid capping (G) and terminal (GO—) groups, R°°— can be any of the following: an alkyl group including linear and branched chain alkyl groups having the formula, $C_fH_{2f+1}$—, wherein $f$ is an integer from 1 to 12, such as, for example, methyl, ethyl, n-propyl, isopropyl, n-butyl, octyl and dodecyl groups; a cycloaliphatic radical including monocyclic and bicyclic groups such as, for example, cyclopentyl, cyclohexyl and bicyclo[2.2.1]heptyl groups; an aromatically unsaturated group including aryl, alkaryl and aralkyl radicals such as, for example, phenyl, naphthyl, xylyl, tolyl, cumenyl, mesityl, t-butylphenyl, benzyl, beta-phenylethyl and 2-phenylpropyl groups; alkyl- and aryl-substituted cycloaliphatic radicals such as, for example, methylcyclopentyl and phenylcyclohexyl radicals; and the like. It is evident, therefore, that the terminal group (GO—) of the polyoxyalkylene chain can be corresponding alkoxy, aryloxy, aralkoxy, alkaryloxy, cycloalkoxy, acyloxy, aryl—C(O)O—, alkyl carbamate and aryl carbamate groups.

The generally preferred R°°— groups are phenyl, lower alkyl radicals, the lower alkyl-substituted aryl groups and the aryl-substituted lower alkyl groups, wherein the term "lower alkyl" denotes $C_1$–$C_4$ alkyl radicals. Therefore, illustrative of the preferred capping groups represented by G are: methyl, ethyl, propyl, butyl, phenyl, benzyl, phenylethyl ($C_6H_5$—$C_2H_4$—), acetyl, benzoyl, methylcarbamyl [$CH_3NHC(O)$—], ethylcarbamyl [$C_2H_5NHC(O)$—], propyl- and butyl-carbamyl groups, phenylcarbamyl [$C_6H_5NHC(O)$—], tolylcarbamyl [$(CH_3)C_6H_4NHC(O)$—], benzylcarbamyl [$C_6H_5CH_2NHC(O)$—], and the like.

It is to be understood that the terminal organic radical (GO—) of the respective polyoxyalkylene blocks of the copolymers of the present invention may be the same throughout the polymer or they may differ. For example, the copolymers can contain polyether blocks in which the terminal group (GO—) is methoxy, and other polyether groups in which GO— is a hydrocarbyl-carbamate group such as methylcarbamate, $CH_3NHC(O)O$—, or benzyloxy ($C_6H_5CH_2O$—).

When used to stabilize flexible urethane foam, an average of from about 50 to about 85 weight percent of the Q-modified polysiloxane-polyoxyalkylene copolymers of the invention is constituted of polyoxyalkylene blocks (E) which portion of the copolymers is also referred to herein as the total polyether content. Correspondingly, the total siloxane content of the copolymers is from about 50 to about 15 weight percent, and represents the sum of the combined weight of the units encompassed by $M_o$ and $D_o$ less the total weight of the polyoxyalkylene blocks (E).

Of the sulfolanyloxyalkyl-substituted copolymers of the invention, the compositions having particular utility as stabilizers of polyether polyol-derived urethane foam, are those within the scope of Formulas III through III-D wherein: $x$ has an average value from about 10 to about 200 and is preferably from about 20 to about 100; $y$ has an average value from about 2 to about 100, and is preferably no more than about 30; $z$ has an average value from about 2 to about 30 and is preferably from about 2 to about 10; and in the polyoxyalkylene block (E), —(R°)$_r$—(OC$_a$H$_{2a}$)$_b$—OG, $r$ is zero or one, R° and G are as previously defined, and $a$ has a value from 2 to 4 provided from about 20 to about 75 weight percent of the oxyalkylene units of the polyoxyalkylene chain —(C$_a$H$_{2a}$O)$_b$, is constituted of oxyethylene units, and $b$ has an average value such that the average molecular weight of the polyoxyalkylene chain is from about 1000 to about 6000. Usually, no more than about 65 weight percent of the chain is constituted of oxyethylene units. The remainder of the polyoxyalkylene chain is usually formed of oxypropylene, oxybutylene or a combination of such units, although preferably the remainder is oxypropylene. It is to be understood that the oxyethylene and other oxyalkylene units can be randomly distributed throughout the polyoxyalkylene chain or they can be grouped in respective sub-blocks.

Of the sulfolanyloxyalkyl-substituted copolymers described herein, the compositions having particular utility as stabilizers of polyester polyol-derived urethane foam are those within the scope of Formulas III through III-D wherein: $x$ is zero or a positive number having an average value up to about 20 and is preferably no more than about 10; $y$ has an average value from about 2 to about 20, and is preferably no more than about 10; $z$ has an average value from about 2 to about 30 and is preferably no more than about 15; and in the polyoxyalkylene block (E), —(R°)$_r$—(OC$_a$H$_{2a}$)$_b$—OG, $r$ is zero or one, R° and G are as previously defined, and $a$ has a value from 2 to 4 provided at least 75 weight percent of the total polyoxyalkylene content of the copolymer is constituted of oxyethylene units, and $b$ has an average value from about 3 to about 30. Usually, the average value of $b$ is from about 4 to about 15, and the average value of $a$ is from 2 to 2.25. The other oxyalkylene units with which oxyethylene may be in combination are oxypropylene [—(C$_3H_6$O)—] and oxybutylene [—(C$_4H_8$O)—] units. Preferably, when used to stabilize polyester urethane foam, the total average poly(oxyethylene) content of the polymers is from about 85 to about 100 weight percent.

In the polymers described herein, the alkyls (R) and sulfolanyloxyalkyl groups (Q) are bonded to silicon by silicon-to-carbon bonds. On the other hand, the polyoxyalkylene blocks (E) of the copolymers to which Formulas III through III-D are specific, may be linked to silicon by Si-C or Si-O bonds. Thus, the Q-modified polyoxyalkylene copolymers of the invention may be: (1) non hydrolyzable with respect to the polyoxyalkylene blocks (when $r$ is one); or (2) hydrolyzable with respect to the polyoxyalkylene blocks (when $r$ is zero).

From the standpoint of use as stabilizers of flexible polyether polyol-based urethane foam produced with a flame-retardant, preferred sulfolanyloxyalkyl-substituted copolymers of the invention are those having the following respective average compositions:

$$Me_3SiO[Me_2SiO]_x[MeSiO]_y[MeSiO]_zSiMe_3 \quad (IV)$$

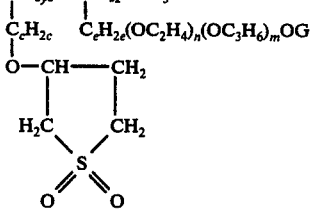

-continued

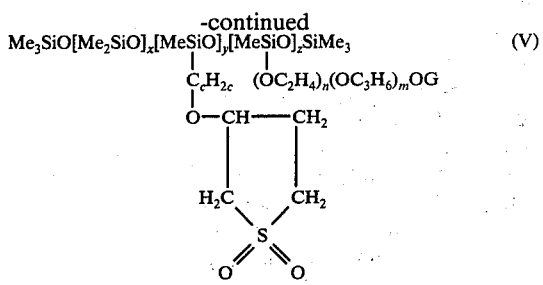

wherein: Me represents methyl (—CH$_3$); c is an integer from 2 to 8; x has an average value from about 10 to about 200, y has an average value from about 2 to about 100, z has an average value from about 2 to about 30, the average values of x, y and z in any given polymer composition being such that the siloxane and polyether contents of the polymer are within the aforesaid ranges of from about 15 to about 50 (siloxane) and from about 85 to about 50 (polyether) weight percent; e is an integer from 2 to 4; G represents an R°°—, R°°C(O)— or R°°NHC(O)— group, where R°° is lower alkyl, ar(lower)alkyl, or phenyl; and m and n are positive numbers such that the average oxyethylene content of the oxyalkylene chain ranges from about 20 to about 65 weight percent and the average molecular weight of the chain is from about 1000 to about 6000. Most preferably, in Formulas IV and V, c is three or four, and the average values of x, y and z are from about 20 to about 100 (x), from about 2 to about 30 (y) and from about 2 to about 10 (z).

From the standpoint of use as stabilizers of flexible urethane foam derived from a polyester polyol and produced with a flame-retardant, preferred sulfolanyloxyalkyl-substituted copolymers of the invention are those having the following respective average compositions:

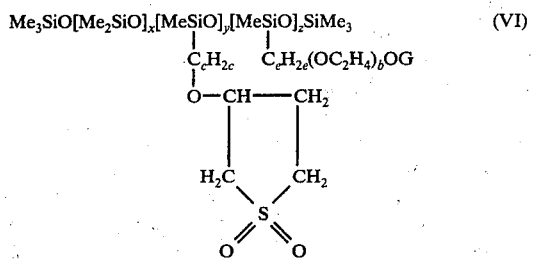

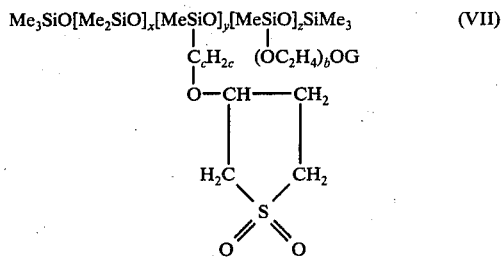

wherein: Me represents methyl; c is an integer from 2 to 8 and is most preferably from 3 to 4; e is an integer from 2 to 4; G is R°°, R°°C(O)— or R°°NHC(O)— in which R°°— is lower alkyl, ar(lower)alkyl or phenyl; x is zero or a positive number having an average value up to about 20 and is usually no more than about 10; y has an average value from about 2 to about 20 and is usually no more than about 10; z has an average value from about 2 to about 30 and is usually no more than about 15; b has an average value from about 3 to about 30 and is usually from about 4 to about 15; and the values of x, y, z and b in any given polymer composition are such that the siloxane and polyether contents are within the aforesaid ranges from about 15 to about 50 (siloxane) and from about 85 to about 50 (polyether) weight percent. When the dialkylsiloxy units (X) are present, x usually has an average value of at least about 0.5, and more usually has an average value of at least about one.

The sulfolanyloxyalkyl-substituted polyalkylsiloxane hydrides and the sulfolanyloxyalkyl-substituted polyalkylsiloxane-polyoxyalkylene copolymers of the present invention are provided by any one of a number of different reactions. In regard to the copolymers, the particular method employed depends primarily on whether the respective bonds between silicon and the polyoxyalkylene blocks (E) are Si—C or Si—O.

One method for providing the copolymer compositions in which the polyoxyalkylene blocks of the Z and/or M' units are linked to silicon through Si—C bonds comprises the catalyzed addition of monoolefinic polyoxyalkylene ethers to the Q-substituted polyalkylsiloxane hydrides. This hydrosilation reaction is referred to herein as Method A and is illustrated by the following equation wherein the Q-modified Si—H reactant is expressed by above Formula II:

Equation 1:

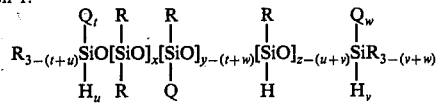

Formula II

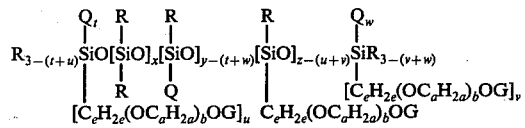

in which, as previously defined herein: Q is the silicon-bonded monovalent grouping, —R'—O—sulfolanyl, —R'— being bivalent alkylene of 2 to 8 carbon atoms; R is alkyl; —(OC$_a$H$_{2a}$)$_b$OG is an organic-capped polyoxyalkylene chain; e is an integer having a value from 2 to 6; t, u, v, w, t+u and v+w have respective values of zero or one; t+w and u+v have respective values of zero, one or two; x is zero or a positive number having an average value up to about 200; y has an average value from about 2 to about 100; and z has an average value from about 2 to about 30.

Preferably, the monoolefinic or alkenyl end-blocking group, —C$_e$H$_{2e-1}$, of the polyether reactant employed in Method A is vinyl, allyl or methallyl, the allyl end-blocked reactants being especially suitable. One method for preparing such polyether reactants comprises starting alkylene oxide polymerization with an alkenol having at least three carbon atoms such as allyl alcohol to provide HO(C$_a$H$_{2a}$O)$_b$C$_e$H$_{2e-1}$ (wherein e has a value of at least 3), followed by capping of the terminal hydroxyl group with the aforesaid organic radical G—, such as methyl, phenyl, benzyl, acetyl, methylcarbamyl and like capping groups. Further details concerning the method of preparation of such polyether reactants are as described, for example, in British Patent Specifications Nos. 1,220,471 and 1,220,472. Alternatively, the polyether reactants can be prepared by starting the alkylene oxide polymerization with an alkanol such as methanol or butanol, an aralkyl alcohol such as benzyl alcohol, a phenol such as phenol itself and the like, followed by capping of the terminal hydroxyl group of the reaction product with the monoolefinic group such as vinyl, allyl, methallyl and the like. Of these monoolefinically unsaturated polyether reactants, allyl alcohol-started polyoxyalkylene ethers are especially suitable. When the polyether reactants comprise a combination of different oxyalkylene units, the various oxyalkylene units can be randomly distributed throughout the chain such as when a mixture of alkylene oxides is polymerized, or they can be arranged as sub-blocks such as when the respective alkylene oxides are polymerized sequentially.

The polymers of this invention wherein polyoxyalkylene blocks (E) are joined to silicon through an Si—O—C bond are provided by the catalyzed condensation of silicon-bonded hydrogen of the Q-substituted polyalkylsiloxane hydride fluids with hydrogen of the —OH group of hydroxyl-terminated polyether reactants. This method is referred to herein as Method B and is illustrated by the reaction of the following equation 2 in which the said hydride reactant also has the average composition expressed by Formula II shown in above equation 1.

Equation 2:

Si—H Reactant of Formula II + $z$ HO—$(C_aH_{2a}O)_bG$ ⟶

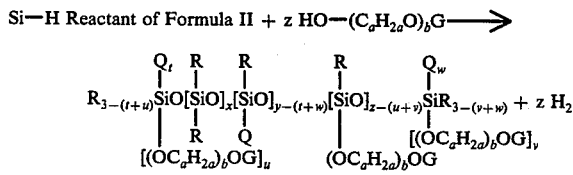

wherein: Q, R, —$(OC_aH_{2a})_bOG$, $t$ through $z$, $t+u$, $v+w$, $t+w$ and $u+v$ have the aforesaid significance such as is summarized with specific reference to equation 1.

From equations 1 and 2 it is evident that when $t$, $u$, $v$ and $w$ are zero, the Q-modified Si—H reactants and copolymer products are endblocked by M units [$(R)_3SiO_{1/2}$] and are of the type encompassed by Formulas II-A and III-A, respectively, as illustrated by the following equations 1a and 2a:

Equation 1a:
$R_3SiO[R_2SiO]_x[RSiO]_y[RSiO]_zSiR_3$ + $z$ $GO(C_aH_{2a}O)_bC_eH_{2e-1}$
            |   |
            Q   H ⟶ $R_3SiO[R_2SiO]_x[RSiO]_y[RSiO]_zSiR_3$
                |      |
                Q    $C_eH_{2e}(OC_aH_{2a})_bOG$ Equation 2a:
$R_3SiO[R_2SiO]_x[RSiO]_y[RSiO]_zSiR_3$ + $z$ $G(OC_aH_{2a})_b$—OH
            |   |
            Q   H ⟶ $R_3SiO[R_2SiO]_x[RSiO]_y[RSiO]_zSiR_3$ + $z$ $H_2$
                |    |
                Q   $(OC_aH_{2a})_bOG$ wherein R, Q, G, $x$, $y$, $z$, $a$ and $b$ are as previously defined.

It is also evident from equations 1 and 2 that: (1) when $t$ and $w$ are both one and thus $u$ and $v$ are zero, the endblocking units are M″ [$(Q)(R)_2SiO_{1/2}$] and the hydrides and copolymer products are of the type encompassed by Formulas II-B and III-B, respectively; (2) when $t$ and $w$ are both zero and $u$ and $v$ are both one, the endblocking units are M° [$(H)(R)_2SiO_{1/2}$] or M′ [$(E)(R)_2SiO_{1/2}$] and the hydrides and copolymers are within the scope of Formulas II-C and III-C, respectively; (3) when $t$ and $v$ are both one and thus $u$ and $w$ are zero, the endblocking monofunctional units are different (M° and M″ in the hydrides and M′ and M″ in the copolymers) as shown by Formulas II-D and III-D, respectively; and (4) when the sum $t+u+v+w$ is one, the polymers also have different endblocking units, that is, a combination of M and M° or M″ in the hydrides, and a combination of M and M′ or M″ in the copolymers.

It is to be understood that the composition of the polyoxyalkylene chain, —$(OC_aH_{2a})_b$—, of the particular alkenyl-endblocked or hydroxyl-terminated polyether reactant employed in the reactions of equations 1 and 2 (as well as in the reactions of the other equations discussed below), is governed by the desired end use application of the sulfolanyloxyalkyl-modified copolymer products. Thus, when the product is to be employed to stabilize polyether polyol-based urethane foam, the polyoxyalkylene chain of the polyether reactants is constituted, on the average, of from about 20 to about 75, and preferably from about 20 to about 65, weight percent of oxyethylene units, —$(OC_2H_4)$—, the remaining oxyalkylene units being oxypropylene and/or oxybutylene, thereby providing sulfolanyloxyalkyl-modified copolymers in which the polyoxyalkylene blocks (E) have a corresponding oxyethylene content. Similarly, in applying the respective hydrosilation and condensation reactions of equations 1 and 2 to the formation of sulfolanyloxyalkyl-modified copolymers intended for use as stabilizers of polyester polyol-based foam, the polyoxyalkylene content of the respective alkenyl-endblocked and hydroxyl-terminated polyether reactants is constituted, on the average, of at least 75 and preferably at least 85, weight percent of oxyethylene, the remaining oxyalkylene units being oxyethylene (which is preferred), oxypropylene and/or oxybutylene.

A third method for preparing the sulfolanyloxyalkyl copolymers of the present invention comprises the overall reaction of: (a) equilibrated unmodified polyalkylsiloxane hydrides; (b) the respective alkenyl-endblocked or hydroxyl-terminated polyether reactants shown in equations 1 and 2; and (c) alkenyl sulfolanyl ethers as the source of Q. The said ethers are collectively referred to herein by the symbol $Q_o$ and have the formula,

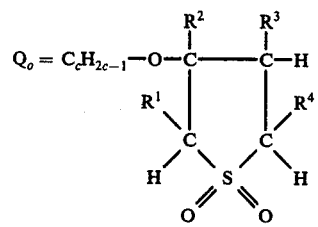

where, as defined with respect to Q, $c$ is an integer having a value from two to eight, and $R^1$, $R^2$, $R^3$ and $R^4$ are independently hydrogen or alkyl having from one to four carbon atoms. In accordance with one embodiment of this method, referred to herein as Method C, copolymers of the invention in which the bonds between silicon and the polyoxyalkylene blocks are Si—C, are provided by the concurrent hydrosilation of the above-described alkenyl-endblocked polyether and unsaturated sulfolanyl ether reactants ($Q_o$). This embodiment is illustrated by the following equation 3:

Equation 3:

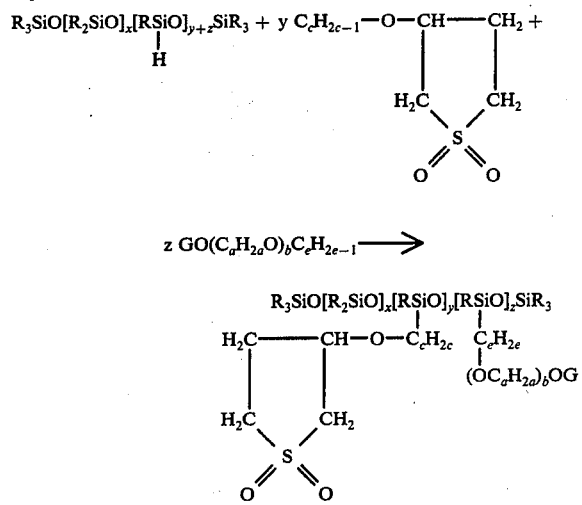

It is to be understood that the reaction of equation 3 may also be carried out by first hydrosilating $z$ moles of the polyether reactant to provide an intermediate having the average composition, $R_3SiO[R_2SiO]_x[RSiO]_y[RSiO]_zSiR_3$
   $\quad\quad\quad\quad\quad\quad\quad\quad$ H $\quad$ $C_eH_{2e}(OC_aH_{2a})_bOG$ which is then reacted with $y$ moles of the unsaturated sulfolanyl ether reactant to provide the product shown in equation 3.

In accordance with another embodiment of Method C, the equilibrated polyalkylsiloxane hydride fluid shown in equation 3 is reacted initially with $y$ moles of the unsaturated sulfolanyl ether reactant followed by reaction of the intermediate sulfolanyloxyalkyl-modified polyalkylsiloxane hydride with $z$ moles of either the monoolefinically unsaturated polyether reactant shown in equation 1 or the hydroxyl-terminated polyether reactant shown in equation 2. This sequence of reactions is shown by equations 3a–3c wherein 3-allyloxysulfolane is illustrated as the alkenyl sulfolanyl ether reactant:

Equation 3a:

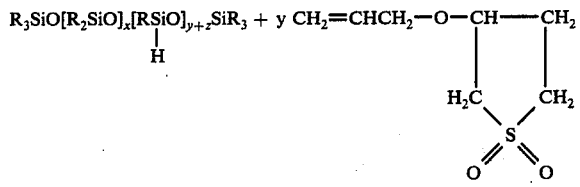

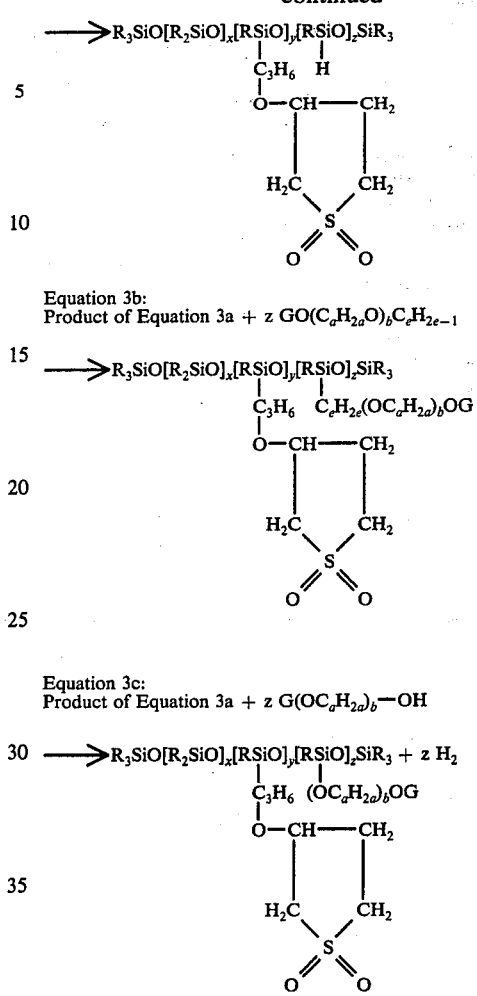

wherein R, G, $a$, $b$, $e$, $x$, $y$ and $z$ are as previously defined. When R is methyl and the polyether reactant of equation 3b is $GO(C_3H_6O)_m(C_2H_4O)_nCH_2CH=CH_2$ or $GO(C_2H_4O)_bCH_2CH=CH_2$, the respective polymer products have the average compositions shown hereinabove by Formulas IV and VI in which each of $c$ and $e$ is three. Likewise, when R is methyl and the polyether reactant of equation 3c is $GO(C_3H_6O)_m(C_2H_4O)_n$—H or $GO(C_2H_4O)_b$—H, the respective polymer products have the average compositions shown hereinabove by Formulas V and VII in which $c$ has a value of three.

The hydrosilation reactions illustrated by equations 1, 1a, 3, 3a and 3b, which overall comprise the addition of Si—H to the respective alkenyl groups of the polyether and sulfolane reactants, are effected in the presence of a platinum catalyst. Particularly effective is platinum in the form of chloroplatinic acid dissolved, if desired, in a solvent such as tetrahydrofuran, ethanol, butanol, 1,2-dimethoxyethane or mixed solvents such as ethanol/1,2-dimethoxyethane. It is to be understood, however, that other platinum derivatives known to the art as hydrosilation catalysts may also be used. For example, also suitable as promoters of the hydrosilation reaction are the platinum catalysts prepared by reaction of chloroplatinic acid and an alcohol such as octanol as described in U.S. Pat. No. 3,220,972. The platinum is present in a catalytic amount such as, for example, from about 5 to about 400 parts by weight per million (p.p.m.) parts of the combined weight of the silicon-containing and organic reactants. The more usual platinum concentration is no more than about 200 p.p.m. Suitable reaction temperatures range from about room temperature (20° C.) to about 200° C., and are more usually from about 60° C. to about 160° C.

The condensation reactions illustrated by equations 2, 2a and 3c which overall comprise the reaction of silanic hydrogen (Si—H) and hydrogen of the —OH groups of the hydroxyl-terminated polyether reactant, are promoted by a variety of catalysts such as organic derivatives of tin, platinum and other transition metals. Especially suitable are organic derivatives of tin such as tin carboxylates which are typically illustrated by stannous octoate, stannous oleate, stannous laurate and dibutyl tin dilaurate. These catalysts are employed in amounts from about 0.1 to about 5, and usually no more than about 2, weight percent, based on the total weight of the reactants. The Si—H/HO—C condensation reactions are effected at temperatures from about 60° to about 150° C., and more usually from about 80° to about 120° C.

The various reactions of equations 1 through 3c are carried out employing the respective organic reactants (that is, the polyether and alkenyl sulfolanyl ether) in amounts at least sufficient to react with a predetermined proportion of the silicon-bonded hydrogen of the Si—H reactant. From the standpoint of more effective and more complete reaction of silanic hydrogen, the organic reactants are usually employed in excess of stoichiometric requirements. In the reactions wherein the Si—H groups are to be completely reacted with only one of the organic reactants to form the desired final polymer such as the reactions illustrated by equations 1, 1a, 2, 2a, 3b and 3c, the organic reactant may be employed in amounts up to a 100 or more mole percent excess. When the Si—H reactant is either partially reacted initially with one of the organic reactants as shown by equation 3a, or is reacted with the organic reactants concurrently as shown in equation 3, the respective organic reactants are employed in an amount at least sufficient to substantially satisfy the predetermined stoichiometric requirements of the desired reaction, up to about 60 mole percent in excess of the desired stoichiometry. In such operation usually no more than about a 40 mole percent excess of each reactant is required to obtain substantially complete reaction of the silanic hydrogen.

The hydrosilation and condensation reactions may be conducted in the absence or presence of a solvent. Illustrative solvents are any of the following employed individually or in combination with one another: the normally liquid aromatic hydrocarbons such as benzene, toluene and xylene; alcohols such as n-propanol and isopropanol; ethers; ether alcohols; and other such non polar or polar solvents. Upon completion of the respective hydrosilation and condensation reactions, excess reactant and any organic solvent employed in the polymer preparation, may be removed by conventional separation techniques to obtain the final product comprising the polymer compositions of the invention. It is to be understood, however, that some portion or all of the solvent and excess reactants including by-products thereof and the polyether reactant may remain in the product and that such diluted polymer compositions are within the scope and may be used in accordance with the teachings of this invention. In the hydrosilation reactions, the removal or neutralization of the platinum catalyst is usually desirable for long range product stability. Neutralization is readily effected by adding sodium bicarbonate to the reaction mixture followed by filtration of the resultant slurry to remove the neutralizing agent and platinum residues.

The sulfolanyloxyalkyl-modified polyalkylsiloxane hydrides of the invention are in turn prepared by any one of a number of different types of reactions. Overall the methods employed in providing such Q-modified Si—H compositions comprise the use of various combinations of the precursor reactants described below as the source of the indicated siloxy units and Q.

(a) Hexaalkyldisiloxanes, $R_3SiOSiR_3$, when the endblocking units are $R_3SiO_{1/2}$, that is, when $t$, $u$, $v$ and $w$ of Formula II are zero, as specifically shown in Formula II-A.

(b) Di[sulfolanyloxyalkyl]tetraalkyldisiloxanes, $(Q)(R)_2SiOSi(R)_2(Q)$, that is, when $t$ and $w$ of Formula II are both one, as specifically shown in Formula II-B. Such reactants in turn are prepared by hydrolysis of $(Q)(R)_2SiX°$ where $X°$ is chlorine or bromine, employing about one mole of water for every two moles of halide.

(c) Dihydrogentetraalkyldisiloxanes, $(H)(R)_2Si-OSi(R)_2(H)$, when the endblocking units are $(H)(R)_2SiO_{1/2}$, that is, when $u$ and $v$ of Formula II are both one, as specifically shown in Formula II-C.

(d) Cyclic dialkylsiloxane polymers, $[R_2SiO]_h$, where $h$ usually has an average value of from about 3 to about 6, as the source of the difunctional dialkylsiloxy units (X), $R_2SiO_{2/2}$, when such X units are to be incorporated, that is, when $x$ of Formulas II through II-D is a positive number.

(e) Trialkyl-endblocked dialkylsiloxane polymers, $R_3SiO(R_2SiO)_rSiR_3$, where $r$ has an average value of at least two and is usually no more than about 10, as the source of the endblocking units, $R_3SiO_{1/2}$, and as a source of the dialkylsiloxy units (X), $R_2SiO_{2/2}$, when the latter units are to be incorporated.

(f) Sulfolanyloxyalkyl-alkylsiloxane cyclic polymers as the source of the Y units, $(Q)(R)SiO_{2/2}$. These polymers are formed by the hydrolysis of sulfolanyloxyalkylalkyl-dichlorosilanes, $(Q)Si(R)Cl_2$, followed by the base-catalyzed dehydration-cyclization of the hydrolyzate to form cyclics having the formula, $[(Q)Si(R)O]_w$, the average value of $w$ being 3 or more.

(g) Sulfolanyloxyalkylheptaalkylcyclotetrasiloxanes,

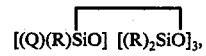

as the source of both the X and Y units. Such cyclics are in turn provided by the platinum-catalyzed hydrosilation reaction between hydrogenheptaalkylcyclotetrasiloxanes,

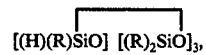

and the above-described alkenyl sulfolanyl ethers ($Q_o$). The said sulfolanyloxyalkylheptaalkylcyclotetrasiloxanes are described and claimed in copending application Ser. No. 592,092, filed June 30, 1975, in the name of Curtis L. Schilling, Jr., and entitled, "Sulfolanyloxyalkyl Cyclic Polysiloxanes", now U.S. Pat. No. 4,049,676.

(h) Polymeric alkylsiloxane hydride fluids having an Si—H content sufficient to provide from about 200 to about 372 cubic centimeters of hydrogen per gram, as the source of the Z° units,

(i) The above-described alkenyl sulfolanyl ethers (Q$_o$) as the source of Q.

With specific reference to Q-modified polyalkylsiloxane hydrides encompassed by Formula II-A, one method for the preparation thereof comprises equilibration of various combination of reactants (a) and (d)–(h). Illustrative is the reaction of equation 4 shown below which comprises equilibration of reactants (a), (d), (f) and (h). For convenience, polymeric reactants (d), (f) and (h) are shown in equation 4 simply as the siloxy units which they provide to the equilibrated reaction product, and the R$^1$ through R$^4$ groups of the sulfolanyl nucleus of Q are shown as hydrogen.

Equation 4:
g R$_3$SiOSiR$_3$ + x' [R$_2$SiO$_{2/2}$] + y' [RSiO$_{2/2}$]

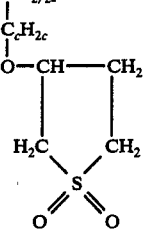

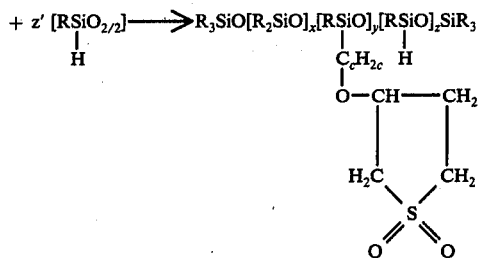

Formula II-A-1

In above equation 4 and other equations hereinbelow, g represents the actual number of moles of the indicated reactant, and x', y' and z' represent the actual number of moles (or mole-equivalents) of the indicated monomeric units provided by the polymeric source of such units. It is be be understood, therefore, that g, y' and z', and when X units are present, x', can be any positive numbers depending upon the scale on which the reactions are run, provided that when normalized on the basis of g=1 (or two moles of monofunctional units), the average value of the mole ratio x':y':z' is within the range of about 0–200:2–100:2–30, respectively, thereby providing Q-modified Si—H fluids wherein the ratio x:y:z has a corresponding average value of about 0–200:214 100:2–30, as previously defined.

It is to be understood that in providing the sulfolanyloxyalkyl-modified polyalkylsiloxane hydrides encompassed by Formula II-A-1 in which no X units are present (that is, when x is zero), the reaction of equation 4 is effected in the absence of reactant (d) whereas when x is a positive number, reactant (d) is employed. In addition to the reaction of equation 4, the Si—H fluids encompassed by Formula II-A-1 wherein x is a positive number, may also be prepared by equilibration of reactants (e), (d), (f) and (h) as illustrated by equation 5 below, or by the equilibration of reactants (a), (g), and (h), as illustrated by equation 6.

Equation 5:
g R$_3$SiO[R$_2$SiO]$_s$SiR$_3$ + x' [R$_2$SiO$_{2/2}$] + y' [RSiO$_{2/2}$]

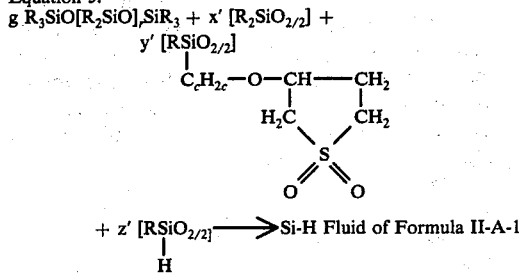

Equation 6:
g R$_3$SiOSiR$_3$ +

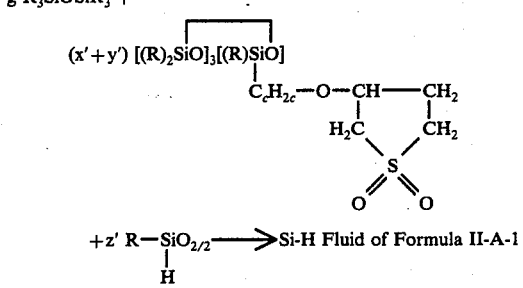

In the sulfolanyloxyalkyl-modified polyalkylsiloxane hydrides produced by the reaction of equation 5, the average number of the R$_2$SiO$_{2/2}$ units, that is, the value of x, corresponds to the value of [x'+(g × r)], normalized on the basis of g=1. In the sulfolanyloxyalkyl-modified polyalkylsiloxane hydrides produced by the reaction of equation 6, the ratio of x:y will of course be 3:1, corresponding to the ratio of the X and Y units present in reactant (g). The ratio of x:y in the equilibrated product may be adjusted to above or below 3:1, as desired, by effecting the reaction of equation 6 in the presence of reactant (d) as an additional source of the X units, thereby increasing the ratio above three, or by the employment of an appropriate proportion of reactant (f) as an additional source of the Y units, thereby decreasing the ratio to less than three.

The Q-modified polyalkylsiloxane hydrides encompassed by Formula II-B are prepared by effecting the equilibration reactions of equations 4–6 in the presence of reactant (b) instead of reactants (a) and/or (e), as illustrated by the following modification of equation 4.

Equation 7:
g (R)$_2$Si—O—Si(R)$_2$         + x' [(R)$_2$SiO$_{2/2}$]

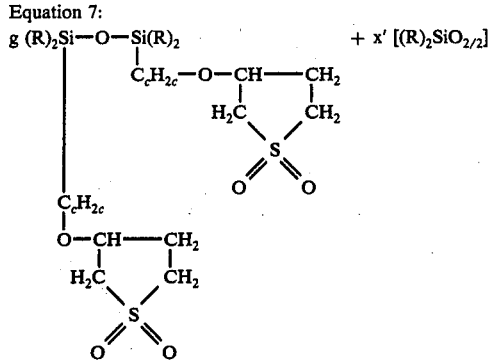

-continued

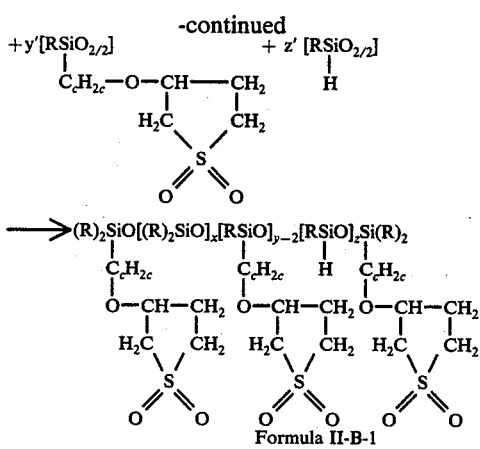

Formula II-B-1

When y of Formula II-B-1 is two, it is evident that the sulfolanyloxyalkyl groups are present solely in the endblocking monofunctional units (M″) and that such compositions are provided by effecting the reaction of equation 7 in the absence of the cyclic source of the Y units, that is, in the absence of reactant (f). If is to be understood that the sulfolanyloxyalkyl-modified polyalkylsiloxane hydrides having Formula II-B-1 may also be prepared by effecting the reaction of equation 7 in the presence of reactant (g) as a partial or sole source of the Y units, that is, in addition to or in place of reactant (f) shown in equation 7.

The Q-modified polyalkylsiloxane hydrides encompassed by Formula II-C are prepared by effecting the equilibration reactions of equations 4 to 6 in the presence of reactant (c) in place of reactants (a) and/or (e). For example, modification of equation 6 in this respect is illustrated by equation 8 below in which reactant (d) is also shown as an additional source of the dialkylsiloxy units (X).

Equation 8:

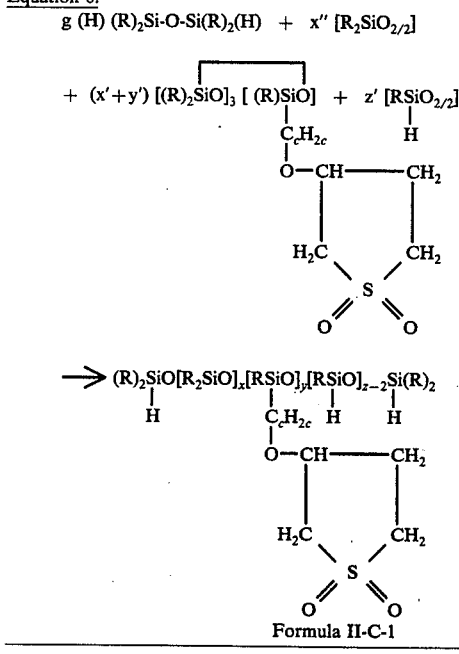

Formula II-C-1

In regard to equation 8, the average relative proportion of total dialkylsiloxy units (X) per two moles of the monofunctional units (M°) present in the product, corresponds to the value of ($x'' + 3x'$), normalized to one mole of reactant (c), that is, normalized to $g = 1$. When z of Formula II-C-1 is two, it is evident that the silicon-bonded hydrogen is present solely in the endblocking monofunctional units (M°) and that such compositions are provided by effecting the reaction of equation 8 in the absence of reactant (h).

When the R groups of each of the reactants shown in equations 4 to 8 is methyl (Me) and, in each instance, c has a value of three, the Q-modified hydrides having Formulas II-A-1, II-B-1 and II-C-1 are corresponding 3-(sulfolan-3-yloxy)propyl-substituted polymethylsiloxane hydrides. For example, when R of each of the reactants of equations 4 to 6 above is methyl and c is three, the equilibrated product has the average composition,

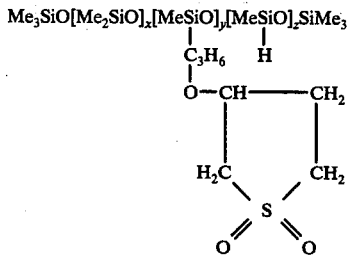

(II-A-2)

wherein x, y and z are as previously defined herein.

The average values of x, y and z in any given Q-modified polyalkylsiloxane hydride of the invention are predetermined by the relative proportions of reactants employed in its preparation. When the Q-modified Si—H compositions of the present invention are to be employed in the preparation of corresponding polyoxyalkylene copolymers thereof such as by the reactions of above equations 1 and 2, the equilibration reactions of equations 4 to 8 are effected employing relative proportions of reactants at least sufficient to obtain an equilibrated product in which the values of x, y and z correspond substantially to the values desired in the copolymer product. Thus, when the hydrides are to be utilized to provide copolymers for end use application as foam stabilizers of flexible polyether-based polyurethane, the relative proportions of monomers employed in the equilibration reactions of equations 4 to 8 are adjusted such that the average values of x, y and z in the equilibrated product are: from about 10 to about 200 (x); from about 2 to about 100 (y); and from about 2 to about 30 (z). Likewise, for use in providing copolymers of the invention intended as foam stabilizers of flexible polyester-based urethane foam, the relative proportions of monomers are adjusted such that the average values of x, y and z in the equilibrated product are: zero or a positive number up to about 20 (x); from about 2 to about 20 (y); and from about 2 to about 30 (z).

In providing the Q-modified Si—H fluids by the one-step reactions of equations 4 to 8, standard base-catalyzed equilibration reaction conditions are not suitable in view of the base-sensitivity of the Si—H groups. Therefore, the equilibration reactions of equations 4 to 8 are promoted by acid catalysts. Suitable catalysts for this purpose are trifluoromethylsulfonic acid ($CF_3SO_3H$) and concentrated (93–98 weight percent) sulfuric acid. The acid is employed in a catalytically effective amount such as from about 0.1 to about four weight percent, based on the total weight of reactants.

The acid-catalyzed equilibration reactions are usually carried out with vigorous mechanical stirring at temperatures within the range from about 20° to about 120° C. at least until the reaction mixture becomes homogeneous. Effecting the reaction at temperatures from about 20° to about 50° C. usually provides a satisfactory rate of reaction. After completion of the reaction, the reaction product is neutralized with base such as sodium bicarbonate and filtered, sometimes adding a liquid hydrocarbon such as xylene or toluene or a filter aid to facilitate the filtration. When a diluent is used, it is conveniently separated from the reaction product by rotary vacuum evaporation.

In addition to the one-step reactions of equations 4 to 8, the sulfolanyloxyalkyl-polyalkylsiloxane hydrides encompassed by general Formula II may also be prepared in step-wise manner. For example, the hydrides having Formula II-A-1 may be prepared by the following sequence of reactions:

Equation 9a:

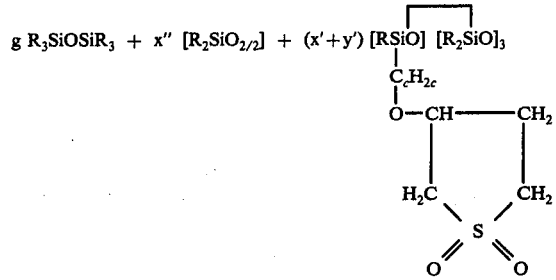

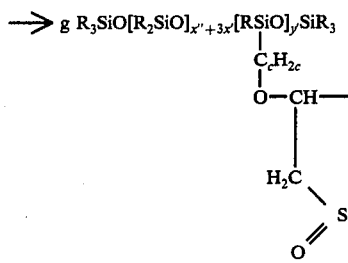

Equation 9b:

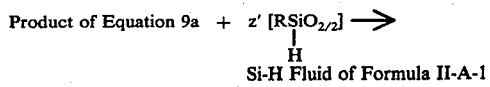

Product of Equation 9a + $z'$ [R$\underset{\underset{H}{|}}{S}$iO$_{2/2}$] $\longrightarrow$ Si-H Fluid of Formula II-A-1

In view of the fact that Si—H reactant ($h$) is not used in the reaction of equation 9a, it may be effected in the presence of conventional alkaline equilibration catalysts useful in the preparation of unmodified polyalkylsiloxanes. Illustrative of such alkaline catalysts are potassium silanolate, cesium hydroxide and tetramethyl ammonium silanolate. Such promoters are usually employed in concentrations of from about 30 to about 50 p.p.m., based on the total weight of reactants. The temperature at which the base-catalyzed equilibration reaction of equation 9a is carried out depends largely on the catalyst employed. Thus, when tetramethyl ammonium silanolate is used, suitable reaction temperatures are from about 75° C. to about 100° C., preferably from about 30°–90° C. The other alkaline catalysts usually require higher temperatures such as at least about 150° C. to about 200° C. The further reaction of the product of equation 9a to introduce the $$\underset{\underset{H}{|}}{R}SiO_{2/2}$$

units, as shown by equation 9b, is carried out in the presence of an acid equilibration catalyst as described with specific reference to the reactions of equations 4 to 8.

A third route to the trialkylsiloxy-endblocked sulfolanyloxyalkyl-polyalkylsiloxane hydrides defined by Formula II-A-1 comprises the use of alkenyl sulfolanyl ethers (Q$_o$), as illustrated by the following sequence of reactions wherein 3-allyloxysulfolane is shown as the ether reactant.

Equation 10a:

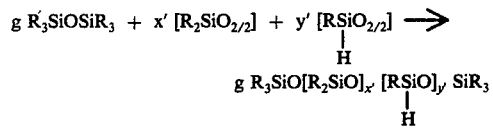

Equation 10b:

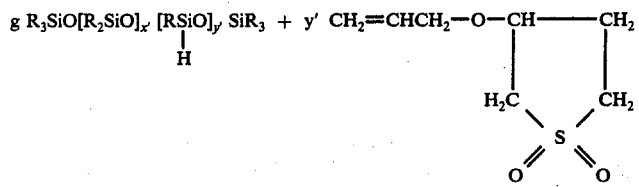

-continued

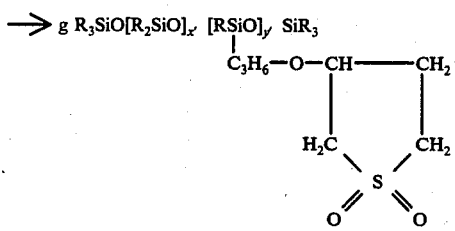

Equation 10c:
Product of Equation 10b + z' [RSiO$_{2/2}$]
                                |
                                H

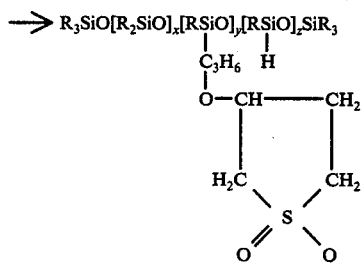

The reaction of equation 10a is effected in the presence of acid equilibration catalysts such as trifluoromethylsulfonic acid and sulfuric acid, at temperatures usually from 20° to about 50° C. The reaction of equation 10b is platinum-catalyzed and is effected under the conditions described above with specific reference to the hydrosilation reactions shown, for example, by equation 1. The reaction of equation 10c is acid-catalyzed and is carried out under the conditions described with reference to equations 4 to 8, using an acid equilibration catalyst. It is to be understood that, instead of introducing the

units in two stages (equations 10a and 10c), such units may be introduced during the reaction of equation 10a in a predetermined amount sufficient to provide the total desired amount (y'+z') followed by partial reaction of the Si—H groups with y' moles of the alkenyl sulfolanyl ether reactant. This latter embodiment is illustrated by the hydrosilation reaction of equation 3a above.

The sulfolanyloxyalkyl-modified polysiloxanepolyoxyalkylene copolymers of this invention are generally useful as surfactants and find particular application in the manufacture of urethane foam. The normally liquid copolymers can be used as such, for stabilization of urethane foam without the need for combination with other surfactants or other type of organic additive. The copolymers can be employed as a 100 percent active stream, or they can be employed in dilute form as a solution in polar solvents (e.g., glycols) or non polar organic solvents such as normally liquid aliphatic and aromatic unsubstituted and halogen-substituted hydrocarbons (e.g., heptane, xylene, toluene, chlorobenzenes and the like).

Preferred diluents, particularly for use in combination with the copolymers intended for use as stabilizers of polyether polyol-derived urethane foam are poly(oxyalkylene) compounds encompassed by the formula, DO(D'O)$_t$·D'' wherein:
D is hydrogen or a monovalent hydrocarbon group including alkyl (e.g., methyl, ethyl, propyl and butyl), aryl (e.g., phenyl and tolyl) and aralkyl (e.g., benzyl) groups;
D' is a bivalent alkylene group (e.g., ethylene, propylene, trimethylene and butylene);
D'' is a monovalent hydrocarbon group such as defined for D; and
$t°$ has an average value of at least two.

When D is hydrogen, it is preferred that such DO— (that is, hydroxyl) groups constitute no more than about 5 weight percent of the solvent. Generally suitable solvents are alkylene oxide adducts of starters such as water, mono-ols, diols and other polyols, of which the organic starters are preferred. Such organic starters are typically illustrated by butanol, propylene glycol, glycerol and 1,2,6-hexanetriol. Preferred adducts of the organic starters are the mixed alkylene oxide adducts, particularly those containing a combination of oxyethylene and oxypropylene units. For example, one class of such organic solvents which may be present in combination with the copolymers of this invention are mixed ethylene oxide-propylene oxide adducts of butanol having the general formula, HO(C$_2$H$_4$O)$_{u'}$(C$_3$H$_6$O)$_{v'}$C$_4$H$_9$, wherein $u°$ has an average value from about 8 to about 50, and $v°$ has an average value from about 6 to about 40. Preferably, the values of $u°$ and $v°$ are such that the weight percent of oxyethylene units is substantially the same as the weight percent of the oxypropylene units. When used, the aforesaid diluents are usually present in the solution in an amount from about one to about 60, and more usually from about 5 to about 45, weight percent, based on the total weight of the sulfolanyloxyalkyl-modified copolymer contained in the solution. It is to be understood, however, that such solutions may have higher contents of diluent and that the extent of dilution, if any, depends largely on the activity specifications of any given foam formulation.

In regard to the sulfolanyloxyalkyl-modified copolymers of the invention intended for use as stabilizers of polyester polyol-derived foam, it is often desirable to employ them in solution in combination with an organic acidic component, a water soluble organic surfactant and/or a water soluble glycol. The copolymers may be present in such solutions in an amount from about 10 to about 80 parts by weight per 100 parts by weight of the solution. Suitable organic acidic components, organic surfactants and glycols for this purpose are as described in U.S. Pat. No. 3,793,360 (particularly at column 17, beginning with line 54 through column 18) the teachings of which in this regard are incorporated as part of the present disclosure by reference thereto.

In addition to the sulfolanyloxyalkyl-substituted polysiloxane-polyoxyalkylene copolymers, the other essential types of components and reactants employed in the production of flexible urethane foam in accordance with the process of this invention are an organic polyol comprising a polyether polyol or a polyester polyol, an organic polyisocyanate, an amine catalyst and a blowing agent. The foam-producing reaction mixtures may also contain a flame-retardant. The amount of the copolymers of this invention present in the final foam-producing reaction mixture may vary over a relatively wide range such as from about 0.1 to about 5 parts by weight per 100 parts by weight of the polyol reactant, and are usually present in an amount of at least about 0.2 and no more than about 3 parts.

In producing the polyether polyol-based urethanes of the present invention, one or more polyether polyols is employed for reaction with the polyisocyanate reactant to provide the urethane linkage. Such polyols have an average of at least two, and usually not more than six, hydroxyl groups per molecule and include compounds which consist of carbon, hydrogen and oxygen and compounds which also contain phosphorus, halogen and/or nitrogen.

Among the suitable polyether polyols that can be employed are the poly(oxyalkylene) polyols, that is, alkylene oxide adducts of water or a polyhydric organic compound as the initiator or starter. For convenience, this class of polyether polyols is referred to herein as Polyol I. Illustrative of suitable polyhydric organic initiators are any one of the following which may be employed individually or in combination: ethylene glycol; diethylene glycol; propylene glycol; 1,5-pentanediol; hexylene glycol; dipropylene glycol; trimethylene glycol; 1,2-cyclohexanediol; 3-cyclohexene-1,1-dimethanol and the 3,4-dibromo-derivative thereof; glycerol; 1,2,6-hexanetriol; 1,1,1-trimethylolethane; 1,1,1-trimethylolpropane; 3-(2-hydroxyethoxy)- and 3-(2-hydroxypropoxy)-1,2-propanediols; 2,4-dimethyl-2-(2-hydroxyethoxy)methylpentanediol-1,5; 1,1,1-tris[(2-hydroxyethoxy)methyl]ethane; 1,1,1-tris[(2-hydroxypropoxy)methyl]propane; pentaerythritol; sorbitol; sucrose; alpha-methyl glucoside; other such polyhydric compounds consisting of carbon, hydrogen and oxygen and having usually not more than about 15 carbon atoms per molecule; and lower alkylene oxide adducts of any of the aforesaid initiators such as propylene oxide and/or ethylene oxide adducts having a relatively low average molecular weight up to about 800.

The above-described polyether polyols are normally liquid materials and, in general, are prepared in accordance with well known techniques comprising the reaction of the polyhydric starter and an alkylene oxide in the presence of an oxyalkylation catalyst which is usually an alkali metal hydroxide such as, in particular, potassium hydroxide. The oxyalkylation of the polyhydric initiator is carried out at temperatures ranging from about 90° to about 150° C. and usually at an elevated pressure up to about 200 p.s.i.g., employing a sufficient amount of alkylene oxide and adequate reaction time to obtain a polyol of desired molecular weight which is conveniently followed during the course of the reaction by standard hydroxyl number determinations. As is well known to this art, the hydroxyl numbers are determined by, and are defined as, the number of milligrams of potassium hydroxide required for the complete neutralization of the hydrolysis product of the fully acetylated derivative prepared from 1 gram of polyol or mixture of polyols. The hydroxyl number is also defined by the following equation which indicates its relationship with the molecular weight and functionality of the polyol:

OH = (56.1 × 1000 × $f$)/M.W.

wherein
OH = hydroxyl number of the polyol,
$f$ = average functionality, that is, the average number of hydroxyl groups per molecule of polyol, and
M.W. = average molecular weight of the polyol.

The alkylene oxides usually employed in providing the polyether polyol reactants are the lower alkylene oxides, that is, compounds having from 2 to 4 carbon atoms including ethylene oxide, propylene oxide, butylene oxides (1,2- or 2,3-) and combinations thereof. When more than one type of oxyalkylene unit is desired in the polyol product, the alkylene oxide reactants may be fed to the reaction system sequentially to provide polyoxyalkylene chains containing respective blocks of different oxyalkylene units or they may be fed simultaneously to provide substantially random distribution of units. Alternatively, the polyoxyalkylene chains may consist essentially of one type of oxyalkylene unit such as oxypropylene capped with oxyethylene units.

A second class of polyether polyols that are suitable for use in preparing polyurethane foams of the present invention are polymer/polyether polyols which, for convenience, are referred to herein as Polyol II. Such reactants are produced by polymerizing one or more ethylenically unsaturated monomers dissolved or dispersed in a polyether polyol in the presence of a free radical catalyst. Suitable polyether polyols for producing such compositions include, for example, any of the above-described polyols encompassed by the definition of Polyol I. Illustrative of suitable ethylenically unsaturated monomers are those encompassed by the formula,

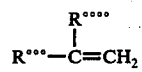

where: R°°° is hydrogen, methyl or any of the halogens (i.e., fluorine, chlorine, bromine or iodine); and R°°°° is R°°°, cyano, phenyl, methyl-substituted phenyl, or alkenyl radicals having from 2 to 6 carbon atoms such as vinyl, allyl and isopropenyl groups. Typical examples of such polymerizable monomers are the following which may be employed individually or in combination: ethylene, propylene, acrylonitrile, methacrylonitrile, vinyl chloride, vinylidene chloride, styrene, alpha-methylstyrene, and butadiene. These and other polymer/polyol compositions which are suitably employed either individually or in combination with Polyol I are those described in British Pat. No. 1,063,222 and U.S. Pat. No. 3,383,351, the disclosures of which are incorporated herein by reference thereto. Such compositions are prepared by polymerizing the monomers in the polyol at a temperature between about 40° and about 150° C. employing any free radical-generating initiator including peroxides, persulfates, percarbonates, perborates and azo compounds. Such initiators are illustrated by hydrogen peroxide, dibenzoyl peroxide, benzoyl hydroperoxide, lauroyl peroxide, and azobis-(isobutyronitrile). The polymer/polyether polyol product may also contain a small amount of unreacted polyether, monomer and free polymer.

When used in the practice of this invention, the polymer/polyol compositions usually contain from about 5 to about 50, and more usually from about 10 to about 40, weight percent of the ethylenically unsaturated monomer polymerized in the polyether polyol. Especially suitable polymer/polyols are those containing:

(A) from about 10 to about 30 weight percent of a copolymer of (1) acrylonitrile or methacrylonitrile, and (2) styrene or alpha-methylstyrene, the said copolymer containing from about 50 to 75 and from about 50 to 25 weight percent of (1) and (2), respectively; and (B) from about 90 to about 70 weight percent of the polyether polyol, and particularly trifunctional polyols such as alkylene oxide adducts of glycerol.

In preparing polyurethane foams in accordance with the present invention, it is to be understood that mixtures of any of the aforesaid polyether polyols encompassed by Polyol I and Polyol II can be employed as reactants with the organic polyisocyanate. The particular polyether polyol or polyols employed depends upon the end-use of the polyurethane foam. Usually diols provide soft foams. Firmer foams are obtained by the incorporation of polyether polyols having more than two hydroxyl groups, including triols, tetraols, pentols and hexols. When it is desired to produce polyurethanes having comparatively high load-bearing properties and-/or diecutability, polymer/polyether polyols of the aforesaid type are used.

The hydroxyl number of the polyether polyol reactant including mixtures of polyols employed in the production of the flexible polyurethane foams of this invention may vary over a relatively wide range such as from about 20 to about 150, and is usually no higher than about 80.

The polyester polyols employed in producing urethane foams in accordance with the method of this invention are the reaction products of: (1) a polyfunctional organic carboxylic acid, and (2) one or more of the aforesaid polyether polyols or one or more of the aforesaid polyhydric organic initiators which are reacted with alkylene oxide to produce such polyether polyols. The polyester polyols contain at least two hydroxyl groups per molecule (as alcoholic OH or as OH in COOH groups). The functionality of these acids is preferably provided by carboxy groups (COOH) or by both carboxy groups and alcoholic hydroxyl groups. The polyesters can have hydroxyl numbers (defined as above) from about 20 to about 150, and preferably have hydroxyl numbers between about 35 and about 80. Typical of the polyfunctional organic carboxylic acids that can be employed in producing polyester polyols useful in preparing the foams of this invention are: dicarboxylic aliphatic acids such as succinic, adipic, sebacic, azelaic, glutaric, pimelic, malonic and suberic acids; and dicarboxylic aromatic acids such as phthalic acid, terephthalic acid, isophthalic acid and the like. Other polycarboxylic acids that can be employed are the "dimer acids" such as the dimer of linoleic acid. Hydroxyl-containing monocarboxylic acids (such as ricinoleic acid) can also be used. Alternatively, the anhydrides of any of these various acids can be employed in producing the polyester polyols.

The organic polyisocyanates that are useful in producing flexible polyether and polyester urethane foam stabilized with the sulfolanyloxyalkyl-modified copolymers of this invention are organic compounds that contain at least two isocyanato groups. Such compounds are well known in the art of producing polyurethane foams, and are conveniently represented by the general formula:

$$Q'(NCO)_i$$

wherein $i$ has an average value of at least two and is usually no more than six, and $Q'$ represents an aliphatic, cycloaliphatic or aromatic radical which can be an unsubstituted hydrocarbyl group or a hydrocarbyl group substituted, for example, with halogen or alkoxy. For example, $Q'$ can be an alkylene, cycloalkylene, arylene, alkyl-substituted cycloalkylene, alkarylene or aralkylene radical including corresponding halogen- and alkoxy-substituted radicals. Typical examples of polyisocyanates for use in preparing the polyurethanes of this invention are any of the following including mixtures thereof: 1,6-hexamethylene diisocyanate; 1,4-tetramethylene diisocyanate; 1-methyl-2,4-diisocyanatocyclohexane; bis(4-isocyanatophenyl)methane; 4-methoxy-1,4-phenylenediisocyanate; 4-chloro-1,3-phenylenediisocyanate; 4-bromo-1,3-phenylenediisocyanate; 5,6-dimethyl-1,3-phenylenediisocyanate; 2,4-tolylene diisocyanate; 2,6-tolylene diisocyanate; mixtures of the 2,4- and 2,6- tolylene diisocyanates; crude tolylene diisocyanates; 6-isopropyl-1,3-phenylenediisocyanate; durylene diisocyanate; triphenylmethane-4,4',4''-triisocyanate; and other organic polyisocyanates known to the polyurethane art. Other suitable polyisocyanate reactants are ethylphosphonic diisocyanate and phenylphosphonic diisocyanate. Of the aforesaid types of polyisocyanates, those containing aromatic nuclei are generally preferred.

Also useful as the polyisocyanate reactant are polymeric isocyanates having units of the formula:

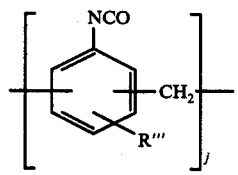

wherein $R'''$ is hydrogen and/or lower alkyl and $j$ has an average value of at least 2.1. Preferably the lower alkyl radical is methyl and $j$ has an average value of from 2.1 to about 3.2. Particularly useful polyisocyanates of this type are the polyphenylmethylene polyisocyanates produced by phosgenation of the polyamine obtained by acid-catalyzed condensation of aniline with formaldehyde. Polyphenylmethylene polyisocyanates of this type are available commercially (e.g., NIAX Isocyanate AFPI), and are low viscosity (50–500 centipoises at 25°

C.) liquids having average isocyanato functionalities between about 2.25 and about 3.2 or higher, depending upon the specific aniline-to-formaldehyde molar ratio used in the polyamine preparation.

Other useful polyisocyanates are combinations of diisocyanates with polymeric isocyanates containing more than two isocyanate groups per molecule. Illustrative of such combinations are: a mixture of 2,4-tolylene diisocyanate, 2,6-tolylene diisocyanate and the aforesaid polyphenylmethylene polyisocyanates and/or polymeric tolylene diisocyanates obtained as residues from the manufacture of the diisocyanates.

On a combined basis, the polyether or polyester polyol and organic polyisocyanate usually constitute the major proportion by weight of the polyurethane-forming reaction mixture. In general, the polyisocyanate and polyol reactants are employed in relative amounts such that the ratio of total —NCO equivalents to total active hydrogen equivalent (of the polyol and any water, when used) is from about 0.8 to about 1.5, preferably from about 0.9 to about 1.2, equivalents of —NCO per equivalent of active hydrogen. This ratio is known as the Isocyanate Index and is often also expressed as a percent of the stoichiometric amount of polyisocyanate required to react with total active hydrogen. When expressed as a percent, the Isocyanate Index may be from about 80 to about 150, and is preferably within the range from about 90 to about 120.

The urethane-forming reaction is effected in the presence of a minor amount of a catalyst comprising an amine. This component of the polyurethane-forming reaction mixture is usually a tertiary-amine. Suitable amine catalysts include one or more of the following: N-methylmorpholine; N-ethylmorpholine; N-octadecylmorpholine; triethylamine; tributylamine; trioctylamine; N,N,N',N'-tetramethylethylenediamine; N,N,N',N'-tetramethyl-1,3-butanediamine; triethanolamine; N,N-dimethylethanolamine; triisopropanolamine; N-methyldiethanolamine; hexadecyldimethylamine; N,N-dimethylbenzylamine; trimethylamine; bis[2-(N,N-dimethylamino)ethyl]ether; triethylenediamine (i.e., 1,4-diazabicyclo[2.2.2]octane); the formate and other salts of triethylenediamine, oxyalkylene adducts of the amino groups of primary and secondary amines and other such amine catalysts which are well known in the art of polyurethane manufacture. Also useful are the beta-tertiary amino amides and esters described in U.S. Pat. No. 3,821,131, as exemplified by 3-(N,N-dimethylamino)-N',N'-dimethylpropionamide. Also useful as the amine catalyst are the beta-tertiary-amino nitriles described in copending application Ser. No. 369,556, filed June 13, 1973, now U.S. Pat. No. 3,925,268, granted Dec. 9, 1975, such as in particular, 3-(N,N-dimethylamino)propionitrile as such or in combination with other tertiary amines such as bis[2-(N,N-dimethylamino)ethyl]ether. The amine catalyst may be introduced to the polyurethane-producing reaction mixture as such or as a solution in suitable carrier solvents such as diethylene glycol, dipropylene glycol, and 2-methyl-2,4-pentanediol ("hexylene glycol").

The amine catalyst is present in the final urethane-producing reaction mixture in a catalytic amount such as from about 0.05 to about 8 parts by weight of active catalyst (that is, the amine exclusive of other components present in solutions thereof) per 100 parts by weight of the polyol reactant. In forming polyether polyol urethane foam, the amine catalyst concentration is usually no higher than about 3 parts. In forming polyester polyol urethane foam, the preferred concentration of total amine catalyst is at least about 0.2 up to about 8 parts, although more than about 5 parts is usually not required.

In producing polyurethanes from polyether polyols usual practice is to include as a further component of the reaction mixture a minor amount of certain metal catalysts which are useful in promoting gellation of the foaming mixture. Such supplementary catalysts are well known to the art of flexible polyether-based polyurethane foam manufacture. For example, useful metal catalysts include organic derivatives of tin, particularly stannous salts of carboxylic acids, dialkyltin dicarboxylates, polyalkyl tin oxides and tin mercaptides. Typical of such cocatalysts are stannous octoate, stannous oleate, stannous acetate, stannous laurate and dibutyltin dilaurate. Additional metal catalysts are organic derivatives of other polyvalent metals such as zinc and nickel (e.g., nickel acetylacetonate). In general, the amount of such metal co-catalysts which can be present in the polyurethane-producing reaction mixture is within the range from about 0.05 to about 2 parts by weight per 100 parts by weight of the polyether polyol reactant. Although such metal catalysts are suitably employed in the preparation of polyether polyol urethane foam, their use is generally avoided in the manufacture of foam derived from a polyester polyol.

Foaming is accomplished by the presence in the reaction mixture of varying amounts of a polyurethane blowing agent such as water which, upon reaction with isocyanate generates carbon dioxide in situ, or through the use of blowing agents which are vaporized by the exotherm of the reaction, or by a combination of the two methods. These various methods are known in the art. Thus, in addition to or in place of water, other blowing agents which can be employed include methylene chloride, liquefied gases which have boiling points below 80° F. and above −60° F., or other inert gases such as nitrogen, carbon dioxide added as such, methane, helium and argon. Suitable liquefied gases include aliphatic and cycloaliphatic fluorocarbons which vaporize at or below the temperature of the foaming mass. Such gases are at least partially fluorinated and may also be otherwise halogenated. Fluorocarbon blowing agents suitable for use in foaming the formulations of this invention include trichlorofluoromethane, dichlorodifluoromethane, 1,1-dichloro-1-fluoroethane, 1,1,1-trifluoro-2-fluoro-3,3-difluoro-4,4,4-trifluorobutane, hexafluorocyclobutene and octafluorocyclobutane. Another useful class of blowing agents include thermally-unstable compounds which liberate gases upon heating, such as N,N'-dimethyl-N,N'-dinitrosoterephthalamide, and the like. The generally preferred method of foaming for producing flexible foams is the use of water or a combination of water plus a fluorocarbon blowing agent such as trichloromonofluoromethane.

The amount of blowing agent employed will vary with factors such as the desired density of the foamed product. Usually, however, from about 1 to about 30 parts by weight of the blowing agent per 100 parts by weight of the polyol reactant is preferred. Foam densities may be within the range from about 0.8 to about 5 pounds per cubic foot (pcf). Polyurethane foam of relatively low density such as 2 pcf and less is usually prepared employing blowing agent comprising water in an amount of at least about 3 parts by weight per 100 parts by weight of polyol reactant, whereas higher density foam is provided at lower levels of water with and without the use of an auxiliary fluorocarbon blowing agent. It is to be understood, however, that these are general guidelines and that the choice of the particular amount of blowing agent employed to obtain a desired foam density specification varies from formulation to formulation and is well within the skill of the art to which the present invention pertains.

The flame retardants that can be employed in producing urethane foam stabilized with the sulfolanyloxyalkyl-substituted copolymers of the invention, can be chemically combined in one or more of the other materials used (e.g., in the polyol or polyisocyanate), or they can be used as discrete chemical compounds added as such to the foam formulation. The organic flame-retardants usually contain phosphorus or halogen, both phosphorus and halogen, or phosphorus and nitrogen. Usually, the halogen, when present, is chlorine and/or bromine. Flame-retardants of the discrete chemical variety include: 2,2-bis(bromomethyl)-1,3-propanediol (also known as dibromoneopentyl glycol); 2,3-dibromopropanol; tetrabromophthalic anhydride; brominated phthalate ester diols such as those produced from tetrabromophthalic anhydride, propylene oxide and propylene glycol; tetrabromobisphenol-A; 2,4,6-tribromophenol; pentabromophenol; brominated anilines and dianilines; bis(2,3-dibromopropyl)ether of sorbitol; tetrachlorophthalic anhydride; chlorendic acid; chlorendic anhydride; diallyl chlorendate; chlorinated maleic anhydride; tris(2-chloroethyl)phosphate [(ClCH$_2$CH$_2$O)$_3$P(O)]; tris (2,3-dibromopropyl)phosphate; tris(2,3-dichloropropyl)phosphate; tris(1-bromo-3-chloroisopropyl)phosphate; bis(2,3-dibromopropyl)phosphoric acid or salts thereof; oxypropylated phosphoric and polyphosphoric acids; polyol phosphites such as tris(dipropylene glycol)phosphite; polyol phosphonates such as bis(dipropylene glycol)hydroxymethyl phosphonate; di-poly(oxyethylene)hydroxymethyl phosphonate; di-poly(oxypropylene)phenyl phosphonate; di-poly(oxypropylene)chloromethyl phosphonate; di-poly(oxypropylene)butyl phosphonate; and O,O-diethyl-N,N-bis(2-hydroxyethyl)aminomethyl phosphonate. Also suitable are compounds having the formulas:

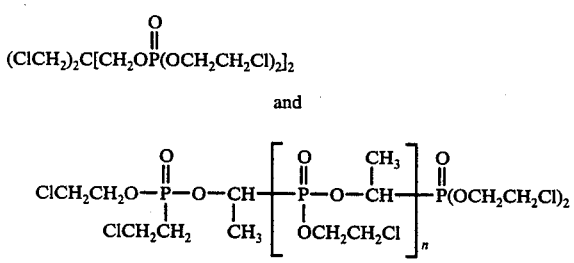

which are available from Monsanto Chemical Company under the names Phosgard 2XC-20 and Phosgard C-22-R, respectively. Other suitable flame-retardants comprise halogen-containing polymeric resins such as polyvinylchloride resins in combination with antimony trioxide and/or other inorganic metal oxides such as zinc oxide, as described in U.S. Pat. Nos. 3,075,927; 3,075,928; 3,222,305; and 3,574,149. Illustrative of suitable inorganic phosphorus-containing flame-retardants is the ammonium polyphosphate available from Monsanto Chemical Company under the name Phoscheck P30. The latter is especially useful as a flame-retardant for polyester urethane foam. It is to be understood that other flame-retardants known to the art may be used and that the aforesaid compounds may be employed individually or in combination with one another.

Of the above flame-retardants, those of the discrete chemical compound variety which contain groups reactive with hydroxyl or isocyanato groups can be used as reactants in producing the polyether polyol or polyester polyol or they can be reacted with organic polyisocyanates, to produce corresponding modified polyols or polyisocyanates having chemically combined flame-retarding groups. Such modified polyols and polyisocyanates are also useful as reactants in the process of this invention. In such cases, due regard must be given to the possible effect of the functionality of the compound on the other properties (e.g., degree of flexibility) of the resulting foam.

The flame-retarding agent can be present in the foam formulations described herein in an amount from about 1 to about 30 parts by weight per one hundred parts by weight of the polyol reactant. Usually the flame-retardant is employed in an amount of at least about 5 parts by weight per 100 parts by weight of polyol. As will be evident to those having skill in the art, the particular amount of flame-retardant employed depends largely on the efficiency of any given agent in reducing flammability of polyurethane foam.

The polyurethane foams may be formed in accordance with any of the processing techniques known to the art. Usually the "one-shot" process is used. In this method, the polyol and polyisocyanate reactants are independently added to the foam-producing reaction mixture and the —OH/—NCO reaction is effected simultaneously with the foaming operation. It is often convenient to add the foam stabilizing component comprising the sulfolanyloxyalkyl-substituted polysiloxane-polyoxyalkylene copolymers of the present invention to the reaction mixture as a premixture with one or more of the blowing agent, polyol, amine catalyst and, when used, the flame-retardant. The foaming and urethane-forming reactions occur without the application of external heat. Often the resulting foam is cured by heating the foam at a temperature between about 100° C. and about 150° C. for about 5 to about 60 minutes to eliminate any surface tackiness, as desired. It is to be understood that variations in process conditions and manipulative steps can be used as known in the art. For example, the various ingredients of the reaction mixture can be combined and the foaming reaction mixture poured into a mold, or the various ingredients can be combined and the foaming reaction mixture commenced and completed in a mold.

The relative amounts of the various components present in the foam-producing reaction mixture are not narrowly critical. The polyol and polyisocyanate are present in the foam-producing formulation in a major amount. The relative amounts of these two components is the amount required to produce the urethane structure of the foam and such relative amounts are well known in the art. The source of the blowing action such as water, auxiliary blowing agents, catalyst and the foam stabilizer are each present in a minor amount necessary to achieve the function of the component. Thus, the blowing agent is present in a minor amount sufficient to foam the reaction mixture, the amine catalyst is present in a catalytic amount (i.e., an amount sufficient to catalyze the reaction to produce the urethane at a reasonable rate), and the sulfolanyloxyalkyl-substituted copolymers of this invention are present in a foam-stabilizing amount, that is, in an amount sufficient to stabilize the foam. The preferred amounts of these various components are as given hereinabove.

If desired, other additional ingredients can be employed in minor amounts in producing the polyurethane foams in accordance with the process of this invention. Illustrative of such additives are: cross-linking agents such as glycerol, triethanolamine and their oxyalkylene adducts; compression set additives (e.g., hexylene glycol); additives to regulate cell structure so as to coarsen cells and thereby reduce the tendency of the foam to split (e.g., paraffin oil); fillers; dyes; pigments; and, particularly in regard to polyester polyol-derived foam, anti-discoloration additives including anti-scorch and anti-oxidation agents such as phenols substituted with tertiarybutyl groups as exemplified by 2,6-di-tert-butyl-4-methylphenol ("Ionol"), oxirane-containing compounds (e.g., propylene oxide), triorgano- (e.g., triphenyl-) substituted phosphites and phosphines, and other anti-discoloration additives known to the art.

The flexible urethane foams produced in accordance with this invention can be used in the same areas as conventional polyether and polyester urethane foams, the products formed with a flame-retarding agent being especially useful where reduced combustibility properties are beneficial. Thus, the foam products are useful as textile interliners, cushioning materials for seating and mattresses, for packaging of delicate objects, as gasketing materials, and the like.

The following examples are merely illustrative of the present invention and are not intended as a limitation upon the scope thereof.

It is to be understood that in the formulas included in the data which follows, "Me" designates methyl (—CH$_3$).

As expressed with reference to the equilibrated Q-modified and unmodified polymethylsiloxane hydrides described in the examples, the theoretical weight percent of Me(H)SiO contained therein corresponds to the weight [60 (y+z)] contributed by Me(H)SiO divided by the calculated molecular weight of the equilibrated product times 100. The found weight percent of Me(H)SiO is derived from the Si-H analysis of the equilibrated product in accordance with the conversion:

Weight Percent Me(H)SiO Found =

$$\frac{\text{cc. H}_2 \text{ per gram} \times 100}{373.3}$$

where the factor 373.3 is the theoretical number of cubic centimeters of hydrogen provided per gram of fluid consisting of 100 percent Me(H)SiO (that is, 22,400 cc. of hydrogen divided by the unit molecular weight of 60).

With reference to the foam data of the examples and control runs, the following terms and abbreviations have the indicated significance:

The abbreviation "p.p.h.p." means parts by weight per 100 parts by weight of total polyol reactant.

"Rise" denotes the foam height and is directly proportional to potency of the surfactant.

"Breathability" denotes the porosity of a foam, being roughly proportional to the number of open cells in a foam, and was measured in accordance with the NOPCO breathability test procedure described by R. E. Jones and G. Fesman, "Journal of Cellular Plastics" (January, 1965). In accordance with this test, breathability is measured as follows: A 2 inch × 2 inch × 1 inch piece of foam is cut from near the center of the bun. Using a Nopco Foam Breathability Tester, Type GP-2 Model 40GD10, air is drawn through the foam sample at a pressure differential of 0.5 inches of water less than atmospheric pressure. The air flow is parallel to the direction of original foam rise. The degree of openness of the foam (or foam breathability) is measured by the rate of air flow through the foam and is reported in standard cubic feet per minute (SCFM).

"CPI" denotes "cells per inch," that is, the number of cells per linear inch of the foam. CPI is directly proportional to the fineness of the cell structure.

"Burning Extent" was determined in accordance with flammability test procedure ASTM D-1692-68 except that five test specimens of foam were used instead of ten. Burning extent denotes the burned length (in inches) of the foam and is reported as the average of the results obtained with the various test specimens of a given foam.

"Burning Time" denotes the average time (in seconds) taken to give the specified burning extent.

In accordance with the following Examples 1–4, illustrative 3-(sulfolan-3-yloxy)propyl-modified polymethylsiloxane hydrides of the invention, referred to herein as Q-modified Si-H Fluids I–IV, were prepared by the acid-catalyzed equilibration of the following Reactants (1)-(4):

Reactant (1): Hexamethyldisiloxane, Me$_3$SiOSiMe$_3$, as the source of the endblocking trimethylsiloxy units, Me$_3$SiO$_{1/2}$.

Reactant (2): Cyclic dimethylsiloxane tetramer, [Me$_2$SiO]$_4$, as a source of the dimethylsiloxy units, Me$_2$SiO$_{2/2}$.

Reactant (3): Polymeric methylhydrogen siloxane as the source of the methylhydrogensiloxy units, Me(H)SiO$_{2/2}$.

Reactant (4): 3-(Sulfolan-3-yloxy)propylheptamethylcyclotetrasiloxane,

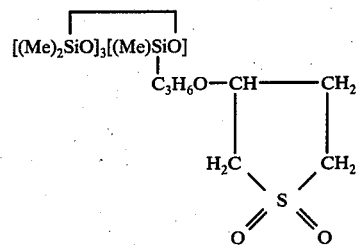

as the source of the 3-(sulfolan-3-yloxy)propyl-methylsiloxy units and as an additional source of the dimethylsiloxy units. As employed in Examples 1–4, this reactant was provided from two preparations, referred to for convenience as Preparation A and Preparation B, respectively, as described below.

Preparation A: To heptamethylcyclotetrasiloxane (28.2 grams, 0.1 mole) combined with toluene (about 40 ml.), there was added 3-allyloxysulfolane (17.6 grams, 0.1 mole) and about 15 ml. of toluene. The hydrosilation reaction was effected in the presence of platinum catalyst added as a four weight percent solution of chloroplatinic acid in dimethoxyethane, while heating up to a maximum temperature of 118° C. Vapor phase chromatographic analysis of a sample of the reaction mixture taken after the first 20 minutes of reaction time, indicated that the reaction had gone to greater than 50 percent completion. Heating was continued for a total reaction time of about 1 hour. After neutralization with sodium bicarbonate and filtration, the product was distilled to remove toluene, unreacted cyclic tetramer (3.7 grams) and a total of 8.3 grams of overhead boiling up to 128° C. and 0.3 mm. mercury pressure. In this preparation, Reactant (4) was the residual product (22.5 grams).

Preparation B: Heptamethylcyclotetrasiloxane (141.0 grams, about 0.5 mole) was heated to 110° C. followed by the addition thereto of platinum catalyst added as a four weight percent solution of chloroplatinic acid in dimethoxyethane. A total of 78.7 grams (0.44 mole) of 3-allyloxysulfolane was added over a period of about 20 minutes during which the reaction temperature was no higher than 134° C. After the addition was completed, the temperature of the reaction mixture was 118° C. Heating at 148°-140° C. was continued for about 1.5 hours. The product was then treated with sodium bicarbonate, filter aid and activated charcoal. After allowing to stir overnight, the reaction mixture was pressure filtered and vacuum distilled. Unreacted cyclic tetramer (75.6 grams) and olefin (about 52.8 grams) was recovered. In this preparation, Reactant (4), that is, 3-(sulfolan-3-yloxy)propyl-heptamethylcyclotetrasiloxane, was recovered at about 150° C. and 0.8 mm. mercury pressure. After cooling, the product was retreated with activated charcoal and pressure filtered. Vapor phase chromatographic analysis of this distilled product was identical to that of the residue product described above as Preparation A.

EXAMPLE 1

Preparation of Q-Modified Si-H Fluid I

In accordance with this example, a 3-(sulfolan-3-yloxy)propyl-modified polymethylsiloxane hydride was prepared by the acid-catalyzed equilibration of a reaction mixture containing above-described Reactants (1)–(4) in the following amounts:

Reactant (1): Hexamethyldisiloxane in an amount of 0.7 grams (0.0041 mole), corresponding to 0.0082 mole of $Me_3SiO_{1/2}$.

Reactant (2): Cyclic dimethylsiloxane tetramer in an amount of 9.7 grams, corresponding to 0.131 mole of $Me_2SiO_{2/2}$.

Reactant (3): Polymethylsiloxane hydride in an amount of 1.5 grams, corresponding to 0.025 mole of $Me(H)SiO_{2/2}$.

Reactant (4): 3-(Sulfolan-3-yloxy)propyl-heptamethylcyclotetrasiloxane (from Preparation A) in an amount of 18.8 grams (0.041 mole), corresponding to 0.123 mole of $Me_2SiO_{2/2}$ and 0.041 mole of the 3-(sulfolan-3-yloxy)propyl-methylsiloxy unit. The reaction mixture was equilibrated in the presence of trifluoromethylsulfonic acid (2 droplets) and was allowed to stir at room temperature for approximately 22 hours. The equilibrated product was then neutralized with sodium bicarbonate, treated with activated charcoal, pressure filtered and vacuum stripped, toluene having been added to reduce the viscosity of the product and thereby facilitate filtration. The results of gel permeation chromatographic analysis indicated that equilibration had occurred. Based upon the relative proportions of Reactants (1)–(4), normalized to two moles of $Me_3SiO_{1/2}$, the average composition of the 3-(sulfolan-3-yloxy)propyl-modified polymethylsiloxane hydride, referred to herein as Q-modified Si-H Fluid I, is:

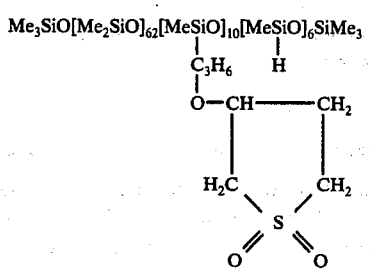

and the theoretical content of Me(H)SiO is 4.82 weight percent. Analysis of this product for silanic hydrogen provided 16.9 and 17.1 cc. $H_2$/gram, corresponding to an average found Me(H)SiO content of 4.55 weight percent which is in substantial agreement with the theoretical value.

EXAMPLE 2

Preparation of Q-Modified Si-H Fluid II

In this preparation, the reaction mixture contained Reactants (1)–(4) in the following amounts:

Reactant (1): Hexamethyldisiloxane in an amount of 1.6 grams (0.01 mole), corresponding to 0.02 mole of $Me_3SiO_{1/2}$.

Reactant (2): Cyclic dimethylsiloxane tetramer in an amount of 38.8 grams, corresponding to 0.52 mole of $Me_2SiO_{2/2}$.

Reactant (3): Polymethylsiloxane hydride in an amount of 3.6 grams, corresponding to 0.06 mole of $Me(H)SiO_{2/2}$.

Reactant (4): 3-(Sulfolan-3-yloxy)propylheptamethylcyclotetrasiloxane (from Preparation B) in an amount 22.9 grams (0.05 mole), corresponding to 0.15 mole of $Me_2SiO_{2/2}$ and 0.05 mole of

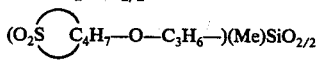

The reaction mixture was equilibrated in the presence of trifluoromethylsulfonic acid (4 droplets) while stirring at room temperature overnight. The equilibrated product was neutralized by stirring with sodium bicarbonate for about 4 hours, adding activated charcoal during the last hour. The viscous product was then pressure filtered, adding toluene to lower viscosity and thereby facilitate the filtration. After vacuum stripping, 59.5 grams of viscous product was recovered. Based upon the relative proportions of Reactants (1)–(4), normalized to two moles of $Me_3SiO_{1/2}$, the average composition of the 3-(sulfolan-3-yloxy)propyl-modified polymethylsiloxane hydride, referred to herein as Q-modified Si-H Fluid II, is:

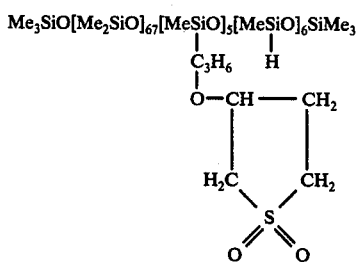

and the theoretical content of Me(H)SiO is 5.41 weight percent. Analysis of Q-modified Si-H Fluid II for silanic hydrogen provided 19.5 and 19.4 cc. $H_2$/gram, corresponding to an average found Me(H)SiO content of 5.21 weight percent which is in substantial agreement with the theoretical content.

EXAMPLE 3

Preparation of Q-Modified Si-H Fluid III

In accordance with this example, a 3-(sulfolan-3-yloxy)propyl-modified polymethylsiloxane hydride was prepared by equilibration of a reaction mixture containing:

Reactant (1): Hexamethyldisiloxane in an amount of 0.44 gram (0.0027 mole), corresponding to 0.0054 mole of $Me_3SiO_{1/2}$.

Reactant (2): Cyclic dimethylsiloxane tetramer in an amount of 2.4 grams, corresponding to 0.0324 mole of $Me_2SiO_{2/2}$.

Reactant (3): Polymethylsiloxane hydride in an amount of 0.97 gram, corresponding to 0.0162 mole of $Me(H)SiO_{2/2}$.

Reactant (4): 3-(Sulfolan-3-yloxy)propyl-heptamethylcyclotetrasiloxane (from Preparation B) in an amount of 18.6 grams (0.0406 mole), corresponding to 0.122 mole of $Me_2SiO_{2/2}$ and 0.0406 mole of the 3-(sulfolan-3-yloxy)propylmethylsiloxy unit. The reaction mixture containing above Reactants (1)–(4) was equilibrated in the presence of trifluoromethylsulfonic acid (3 droplets) and was allowed to stir at room temperature for approximately 22 hours. The equilibrated product was then treated with sodium bicarbonate, filter aid and activated charcoal, pressure filtered and vacuum stripped, toluene having been added to reduce the viscosity of the product and thereby facilitate filtration. Analysis by gel permeation chromatography indicated a low polymer content and high cyclics content. Accordingly, the viscous product was re-equilibrated employing 6–10 droplets of trifluoromethylsulfonic acid catalyst while magnetically stirring at room temperature for about 20 hours. The re-equilibrated material was then stirred for four hours over excess sodium bicarbonate, toluene having been added to reduce viscosity. The product was then treated with filter aid and activated charcoal, followed by pressure filtration and vacuum stripping. Based upon the relative proportions of Reactants (1)–(4), normalized to two moles of $Me_3SiO_{1/2}$, the average composition of the 3-(sulfolan-3-yloxy)propyl-modified polymethylsiloxane hydride, referred to herein as Q-modified Si-H Fluid III, is:

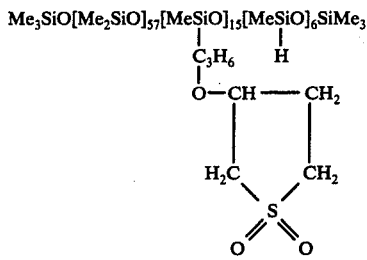

and the theoretical content of Me(H)SiO is 4.35 weight percent. Results of gel permeation chromatographic analysis of the product were consistent with this assigned average composition.

EXAMPLE 4

Preparation of Q-Modified Si-H Fluid IV

In this preparation the reaction mixture contained Reactants (1)–(4) in the following amounts:

Reactant (1): Hexamethyldisiloxane in an amount of 1.6 grams (0.01 mole), corresponding to 0.02 mole of $Me_3SiO_{1/2}$.

Reactant (2): Cyclic dimethylsiloxane tetramer in an amount of 45.9 grams, corresponding to 0.62 mole of $Me_2SiO_{2/2}$.

Reactant (3): Polymethylsiloxane hydride in an amount of 3.6 grams, corresponding to 0.06 mole of $Me(H)SiO_{2/2}$.

Reactant (4): 3-(Sulfolan-3-yloxy)propylheptamethylcyclotetrasiloxane (employed as a mixture from above-described Preparations A and B) in an amount of 11.5 grams (0.025 mole), corresponding to 0.075 mole of $Me_2SiO_{2/2}$ and 0.025 mole of the 3-(sulfolan-3-yloxy)-propyl-methylsiloxy unit.

The reaction mixture was equilibrated in the presence of trifluoromethylsulfonic acid (five droplets) while stirring at room temperature for about 24 hours. The reaction mix was then neutralized by stirring with sodium bicarbonate for about four hours, treated with filter aid and activated charcoal, pressure filtered and vacuum stripped. Analysis be gel permeation chromatography showed low polymer and high cyclics content. Accordingly, the viscous product was re-equilibrated employing 6-10 droplets of trifluoromethylsulfonic acid catalyst while magnetically stirring at room temperature for about 20 hours. The re-equilibrated material was then stirred for four hours over excess sodium bircarbonate, treated with filter aid and activated charcoal, followed by pressure filtration and vacuum stripping. Based upon the relative proportions of Reactants (1)–(4), normalized to two moles of $Me_3SiO_{1/2}$, the average composition of the 3-(sulfolan-3-yloxy)propylmodified polymethylsiloxane hydride, referred to herein as Q-modified Si-H fluid IV, is:

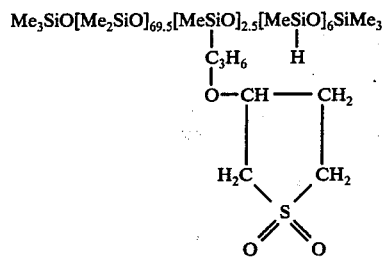

and the theoretical content of Me(H)SiO is 5.84 weight percent. Results of gel permeation chromatographic analysis of the product was consistent with this assigned structure.

In Examples 5, 12, 15 and 16 hereinbelow, abovedescribed Q-modified Si-H Fluids I to IV were employed as hydrosilation reactants in the preparation of corresponding illustrative 3-(sulfolan-3-yloxy)propylpolymethylsiloxane-poly(oxyethylene-oxypropylene) copolymers of the invention, the products being referred to herein as Surfactants A to D, respectively. In these examples, the platinum catalyst was of two types. One was a 4 weight percent solution of chloroplatinic acid hexahydrate in dimethoxyethane. The second was prepared by reacting 10 grams of chloroplatinic acid hexahydrate and 100 grams of octanol at an elevated temperature and reduced pressure. After removal of octanol by distillation (45° C./0.3 mm. pressure), the residual product (35.3 grams) was dissolved in toluene. As used in the examples, the expression "reduced platinum catalyst solution" refers to the resultant toluene solution of the chloroplatinic acid-octanol reaction product and contains about 0.014 gram of platinum per gram of solution which substantially corresponds to the aforementioned typical 4 weight percent solution of chloroplatinic acid hexahydrate in dimethoxyethane.

EXAMPLE 5

Preparation of Surfactant A

In this preparation, Q-modified Si-H Fluid I of example 1 above was reacted with an allyl alcohol-started, methyl-capped poly(oxyethylene-oxypropylene) copolymer which, upon analysis, showed the presence of 1.38 weight percent allyl. Based on this allyl content and an oxyalkylene content constituted of about 40 weight percent oxyethylene, the average composition of the polyether reactant is taken as:

$$CH_2=CHCH_2(OC_2H_4)_{26.4}(OC_3H_6)_{30}OMe$$

The hydrosilation reaction was carried out in a 200 ml. capacity reaction flask typically fitted with a heating mantle, thermometer, stirrer and nitrogen blow-by. The said polyether (48 grams, 0.0162 mole) was combined with toluene (about 68 grams) and dehydrated by heating until about 25 ml. distilled overhead (toluene and traces of water). When the mixture cooled to about 100° C., Q-modified Si-H Fluid I in an amount of 16.4 grams, corresponding to about 0.0124 mole-equivalent of Me(H)SiO, was added thereto as a solution in about 17 grams of toluene. The aforesaid amount of polyether corresponds to about a 30 mole percent excess over the stoichiometric amount required to react completely with the silanic hydrogen content of Q-modified Si—H Fluid I. Upon combining the reactants, several droplets of reduced platinum catalyst solution was added and the mixture was allowed to react at 105° C. for about 70 minutes during which additional catalyst was added. At the end of this period a standard test ($KOH-C_2H_5OH-H_2O$) for silanic hydrogen showed that the residual Si—H content of the mixture had been reduced to 0.1 ml. $H_2$ per 0.5 ml. of sample. The reaction mixture was allowed to stir overnight at room temperature after which it was treated with sodium bicarbonate, activated charcoal, filter aid, pressure filtered and vacuum stripped. The clear dark fluid product (57.2 grams) comprises a 3-(sulfolan-3-yloxy)propyl-substituted polymethylsiloxane-poly(oxyethylene-oxypropylene) copolymer which, on the basis of the normalized average composition of Q-modified Si—H Fluid I, is in turn assigned the average composition,

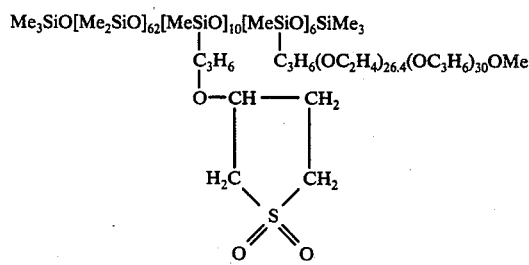

The product of this example is referred to herein as Surfactant A.

EXAMPLES 6–9

In these examples, respective flexible polyether urethane foams were prepared employing Surfactant A as the foam-stabilizing surfactant component of a foam-producing reaction mixture containing a flame-retardant. The particular reaction mixture employed is referred to herein as Foam Formulation A and had the composition set forth in the following Table I.

TABLE I

| FOAM FORMULATION A | |
|---|---|
| Component | Parts By Weight |
| Polyether Polyol having a hydroxyl number of 56 produced by reacting glycerol and propylene oxide | 100 |
| Tolylene Diisocyanate (Index 105) /1/ | 49.73 |
| Tris(2-chloroethyl)phosphate | 10 |
| Water | 4 |
| Bis[2-(N,N-dimethylamino)ethyl]ether employed as a 70 weight per cent solution in dipropylene glycol | 0.1 |
| Stannous Octoate | 0.35 |
| Surfactant A | Varied /2/ |

/1/ This component was a mixture of 2,4-tolylene diisocyanate (80 weight percent) and 2,6-tolylene diisocyanate. Index 105 means that the amount of mixture employed was 105 percent of the stoichiometric amount required to react with the polyol and water present in the foam formulation.
/2/ The specific proportions employed are given in Table II herein.

The foams of these examples as well as the other polyether polyol-based urethane foam preparations described hereinbelow were prepared following substantially the same procedure which entailed the following manipulative steps: After dispensing the polyether polyol in a container (Lily Cup No. 32TN6), the flame-retardant (when used) is added thereto and dispersed therein with a spatula. The surfactant is then added from a syringe and is also dispersed with a spatula. After inserting a baffle, a premixture of the amine catalyst and blowing agent is added but not dispersed. The container containing the aforesaid mixture is then placed in a drill press and the mixture agitated 15 seconds at 2000 revolutions per minute, after which the stannous octoate co-catalyst is added from a syringe. After mixing for an additional 8 seconds, the diisocyanate reactant is added rapidly and the agitation is continued for another 7 seconds. After the mixing cycle, the mixture is poured into a parchment-lined container (12 × 12 × 12 inches) supported by a wooden mold. The foam is allowed to rest in the container for at least 3 minutes and is then post-cured in a hot air oven at 125° C. usually for 8–10 minutes. After cutting, the height of the foam rise is measured, and foam samples are prepared for various physical property determinations including burning extent in the case of the foam products containing a flame-retardant.

In Example 6, Surfactant A was present in Foam Formulation A at 0.6 p.p.h.p. whereas in examples 7–9 lower concentrations were used. As a direct comparison with the foam of example 6, a control foam (Run K-1) was formed employing, in place of Surfactant A, an unmodified polymethylsiloxane-poly(oxyethylene-oxypropylene) copolymer having the average composition,

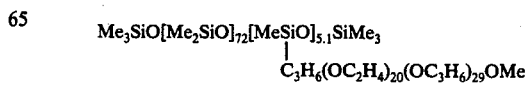

This copolymer is referred to herein as Surfactant AA.

The results of examples 6-9 and run K-1 are given in Table II which follows.

TABLE II
FOAM STABILIZATION WITH SURFACTANT A[1]

| Example | — | 6 | 7 | 8 | 9 |
|---|---|---|---|---|---|
| Control Run | K-1 | — | — | — | — |
| Surfactant | AA[2] | A | A | A | A |
| Parts by weight[3] | 0.6 | 0.6 | 0.3 | 0.25 | 0.20 |
| Rise, inches | 7.6 | 7.9 | 7.7 | 7.5 | 7.1 |
| Breathability, SCFM | 3.4 | 2.9 | 2.8 | 3.6 | 3.6 |
| CPI | 35/40 | 35/40 | 30/35 | 25/30 | 25/30 |
| Density, lbs./cubic ft. | 1.68 | 1.73 | 1.77 | 1.70 | 1.73 |
| Burning extent, inches | 3.7 | 2.0 | 2.0 | 1.9 | 2.0 |
| Burning time, seconds | 67 | 34 | 35 | 33 | 35 |

[1]The sulfolanyloxypropyl-substituted copolymer of example 5.
[2]Not a surfactant of the invention.
[3]Per 100 parts by weight of polyol contained in Foam Formulation A of Table I.

As indicated by the results of example 6 and run K-1 set forth in Table II, the flame retardant containing foam stabilized with sulfolanyloxypropyl-modified Surfactant A of the invention exhibited a substantially lower burning extent than that of the foam produced with unmodified Surfactant AA which is an otherwise excellent stabilizer of flexible polyether urethane foam. The results of examples 7 to 9 further indicate that corresponding foam of substantially the same low burning extent (about 2 inches) is also provided at relatively low concentrations of Surfactant A.

EXAMPLES 10 and 11

In accordance with these examples, a potency determination was made of Surfactant A. In addition to the surfactant, the other components of the foam producing reaction mixture were as identified in the following Table III.

TABLE III
FOAM FORMULATION B

| Component | Parts By Weight |
|---|---|
| Polyether Polyol having a Hydroxyl No. of about 46, produced from glycerol, dipropylene glycol, propylene oxide and ethylene oxide. | 100 |
| Tolylene Diisocyanate /1/ | 57 |
| Blowing Agent | |
| Water | 4.85 |
| Trichlorofluoromethane | 15.0 |
| Dimethylethanolamine | 0.35 |
| Stannous octoate | 0.3 |
| Surfactant A | Varied /2/ |

/1/ As defined in footnote /1/ of Table I.
/2/ For specific proportions employed, refer to Table IV.

As indicated, Foam Formulation B contains 4.85 parts by weight of water per 100 parts by weight of polyol reactant. This system is usually more difficult to stabilize than the more conventional formulations containing less water and thus provides a relatively sensitive test of surfactant potency. As a control foam (Run K-2), above-identified unmodified Surfactant AA was employed as the surfactant component of Foam Formulation B in place of Surfactant A. The results of these foam preparations are given in Table IV which follows.

TABLE IV

| Example | — | 10 | 11 |
|---|---|---|---|
| Control Run | K-2 | — | — |
| Surfactant | AA[1] | A[2] | A[2] |
| Parts by weight[3] | 0.6 | 0.6 | 1.0 |

TABLE IV-continued

| Rise, inches | 11.8 | 11.9 | 12.5 |
|---|---|---|---|
| Breathability, SCFM | 5.2 | 4.5 | 3.5 |
| Top Collapse, inches | 0.4 | 0.3 | 0.1 |

[1]Not a surfactant of the invention.
[2]As described under Example 5.
[3]Per 100 parts by weight of polyol contained in Foam Formulation B of Table III.

The data of Table IV indicate that, as reflected by both the height of the foam rise and the relatively low top collapse, sulfolanyloxypropyl-modified Surfactant A of the invention is a potent stabilizer of flexible polyether urethane foam. Comparison of the results of example 10 and run K-2 in which the respective surfactant concentrations were 0.6 p.p.h.p., shows that the potency of Surfactant A compares favorably with that of Surfactant AA in which the polysiloxane backbone is substituted with methyl groups only.

EXAMPLE 12

Preparation of Surfactant B

In this preparation, Q-modified Si—H Fluid II of example 2 above, was reacted with a polyether having substantially the same average composition employed in the preparation of Surfactant A of example 5. The polyether (74.3 grams, 0.025 mole) was first combined with toluene (100 ml.) and dehydrated as described in example 5. There were then added to the hot solution, additional toluene (25 ml.), Q-modified Si—H Fluid II in an amount of 22.2 grams, corresponding to 0.02 mole-equivalent of Me(H)SiO, and about 0.4 ml. of a 4 weight percent solution of cloroplatinic acid hexahydrate in dimethoxyethane. The reaction mixture cleared in about two minutes. After heating was resumed for about 30 minutes, residual Si—H was about 0.6 cc. $H_2/0.5$ ml. of sample. The reaction mixture was recatalyzed with 0.3 ml. of said chloroplatinic acid solution as well as with reduced platinum catalyst solution. After a total period of heating for about three hours, the mixture was allowed to stir overnight at ambient temperature. At the end of this period, residual Si—H was 0.25 ml. $H_2/0.5$ ml. of sample. After treatment with sodium bicarbonate, filter aid and activated charcoal, pressure filtration and vacuum stripping, a clear, dark liquid product (87.2 grams) was recovered. The product comprises a 3-(sulfolan-3-yloxy)propyl-substituted polymethylsiloxane-poly(oxyethylene-oxypropylene) copolymer which, on the basis of the normalized average composition of Q-modified Si—H Fluid II, is assigned the average composition,

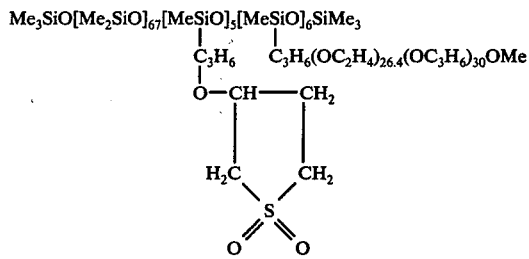

The product of this example is referred to herein as Surfactant B.

EXAMPLE 13

In this example, Surfactant B was employed as the foam-stabilizing component of Foam Formulation A (Table I) in place of Surfactant A. A control foam (Run K-3) stabilized with above-described Surfactant AA was also provided. In both preparations, the concentration of the respective surfactants present in Foam Formulation A was at the same level (0.6 p.p.h.p.). The results are given in Table V which follows.

TABLE V

| Example | — | 13 |
|---|---|---|
| Control Run | K-3 | — |
| Surfactant | AA[1] | B[2] |
| Rise, inches | 7.1 | 7.1 |
| Breathabiity, SCFM | 3.4 | 3.0 |
| Burning extent, inches | 3.47 | 1.77 |
| Burning time, seconds | 62.3 | 27.3 |

[1] Not a surfactant of the invention.
[2] As described under example 12.

The results of Table V further demonstrate that, in regard to stabilization of flexible polyether urethane foam containing a flame-retardant, the sulfolanyloxypropylmodified copolymers of the invention are not only capable of stabilizing such foam but further allow for the formation of foam of markedly reduced burning extent.

EXAMPLE 14

In accordance with this example, the potency of Surfactant B was evaluated by its employment as the surfactant component of Foam Formulation B (Table III) in place of Surfactant A. A control foam (Run K-4) stabiilzed with above-described Surfactant AA was also provided. In both preparations, the concentration of the respective surfactants present in Foam Formulation B was at the same level (0.6 p.p.h.p.). The results are given in Table VI which follows.

TABLE VI

| Example | — | 14 |
|---|---|---|
| Control Run | K-4 | — |
| Surfactant | AA[1] | B[2] |
| Rise, inches | 11.0 | 11.9 |
| Breathability, SCFM | 6.0 | 5.6 |
| Top Collapse, inches | — | <½ |

[1] Not a surfactant of the invention.
[2] As described under example 12.

The data of Table VI indicate that Surfactant B of the invention also has good potency as reflected, in particular, by the height of the foam rise.

EXAMPLE 15

Preparation of Surfactant C

In this preparation, Q-modified Si—H Fluid III of example 3 above was reacted with a stoichiometric excess (about 30 mole percent) of substantially the same polyether reactant employed in the preparation of Surfactant A of example 5. The polyether (44.8 grams, 0.0151 mole) was combined with an equal volume of toluene and, after adding two droplets of acetic acid, the solution was dried by distilling off about 3.0 ml. of aqueous toluene overhead. A solution (40 ml. total volume) of Q-modified Si—H Fluid III (16.1 grams or about 0.0117 mole of MeHSiO) in toluene was then added to the hot dehydrated polyether solution (95° C.) followed by the addition of about 0.20 ml. of reduced platinum catalyst solution. The reaction was continued, recatalyzing with 0.2 ml. of a 4 weight percent solution of chloroplatinic acid hexahydrate in dimethoxyethane, until residual Si—H was reduced to 0.4 ml. of $H_2$ per 0.5 ml. of sample. This product was also neutralized with sodium bicarbonate, treated with filter aid, activated charcoal, pressure filtered and vacuum stripped. The liquid product (52.6 grams) comprises a 3-(sulfolan-3-yloxy)propyl-substituted polymethylsiloxane-poly(oxyethylene-oxypropylene) copolymer which, on the basis of the average composition of the polysiloxane backbone of Si—H Fluid III, is assigned a corresponding average composition, namely,

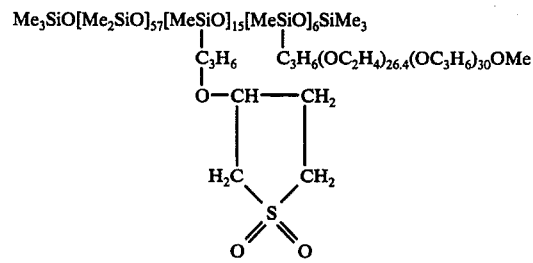

The product of this example is referred to herein as Surfactant C.

EXAMPLE 16

Preparation of Surfactant D

In this preparation, Q-modified Si—H Fluid IV of example 4 above was reacted with substantially the same polyether reactant employed in the preparation of Surfactant A of example 5. The polyether (111.5 grams, 0.0375 mole) was combined with 110 ml. of toluene and four droplets of acetic acid and was then dried by azeotropic distillation of 25 ml. of toluene-water overhead. While the dried polyether solution was at 96° C., there were added thereto: Si—H Fluid IV (27.0 grams, corresponding to about 0.026 mole of MeHSiO); toluene (about 30 ml.); and 0.2 ml. of reduced platinum catalyst solution. The reaction mixture cleared rapidly and exothermed to 100° C. After heating for about 3 hours, the standard test for residual Si—H provided 0.7 ml. of $H_2$ per 0.5 ml. of sample. Heating was discontinued and the mixture treated with sodium bicarbonate, filter aid and activated charcoal. After pressure filtration and vacuum stripping, a clear dark liquid product (123.5 grams) was provided. This product comprises a 3-(sulfolan-3-yloxy)propyl-substituted polymethylsiloxane-poly(oxyethylene-oxypropylene) copolymer which, on the basis of the average empirical formula for Q-modified Si-H Fluid IV, is assigned the average composition,

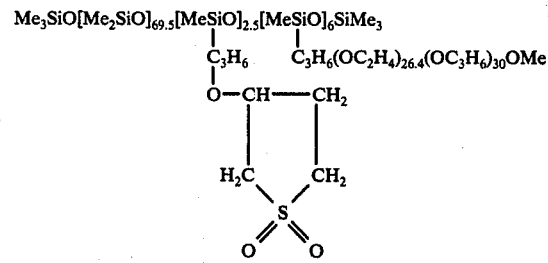

The product of this example is referred to herein as Surfactant D.

EXAMPLES 17 AND 18

In these examples, Surfactants C and D of examples 15 and 16, respectively, were employed as the surfactant component of flame-retardant containing Foam Formulation A (Table I) in place of Surfactant A. As a control foam (Run K-5), above-described Surfactant AA which is an unmodified polymethylsiloxane-poly(oxyethylene-oxypropylene) copolymer, was employed. In each foam preparation, the respective surfactants were used in the same concentration, namely, 0.6 p.p.h.p. The results are given in the following Table VII.

TABLE VII

| Example | — | 17 | 18 |
|---|---|---|---|
| Control Run | K-5 | — | — |
| Surfactant | AA[1] | C[2] | D[3] |
| Rise, inches | 7.2 | 7.0 | 7.3 |
| Breathability, SCFM | 3.6 | 5.9 | 3.3 |
| Burning extent, inches | 4.1 | 2.5 | 2.1 |
| Burning time, seconds | 65.3 | 41.3 | 34.2 |

[1]Not a surfactant of the invention.
[2]As described under example 15.
[3]As described under example 16.

The results of Table VII further demonstrate the outstanding property of the sulfolanyl-bearing copolymers of the invention is allowing for the formation of flameretardant containing flexible urethane foam of significantly reduced burning extent.

EXAMPLES 19 AND 20

In these examples, the potency of Surfactants C and D of the invention was evaluated by their employment as the respective surfactant components of non flameretarded Foam Formulation B (Table III) in place of Surfactant A. A control foam (Run K-6) stabilized with above-described Surfactant AA was also provided. In each foam preparation, the concentration of the respective surfactants present in Foam Formulation B was at the same level (0.6 p.p.h.p.). The results are given in Table VIII which follows.

TABLE VIII

| Example | — | 19 | 20 |
|---|---|---|---|
| Control Run | K-6 | — | — |
| Surfactant | AA[1] | C[2] | D[3] |
| Rise, inches | 10.8 | 9.6 | 11.4 |
| Breathability, SCFM | 4.6 | 5.2 | 4.5 |
| Top collapse, inches | — | >1[4] | <½ |

[1]Not a surfactant of the invention.
[2]As described in example 15.
[3]As described in example 16.
[4]Somewhat coarse foam.

The results of Table VIII indicate that, although the potency of Surfactant C is acceptable, the potency of Surfactant D was particularly outstanding from the standpoint of both the foam rise and low degree of settling (top collapse).

EXAMPLES 21 TO 24

In these examples, above-described Surfactants A, B, C and D of the invention were employed as the respective foam stabilizing components of a flexible polyether urethane foam formulation containing tris(2,3-dichloropropyl)phosphate as the flame-retardant. The components and relative proportions of the reaction mixture, referred to herein as Foam Formulation C, are as set forth in the following Table IX.

TABLE IX
FOAM FORMULATION C

| Components | Parts By Weight |
|---|---|
| Polyether Polyol having a Hydroxyl Number of about 46 produced by reacting glycerol, propylene oxide and ethylene oxide. | 100 |
| Tolylene Diisocyanate (Index 105)[1] | 48.4 |
| Water | 4 |
| Bis[2-(N,N-dimethylamino)ethyl]ether employed as a 70 weight percent solution in dipropylene glycol | 0.1 |
| Stannous Octoate | 0.25 |
| Tris(2,3-dichloropropyl)phosphate | 12.5 |
| Surfactant A, B, C or D | 0.6 |

[1]As identified in footnote 1 of Table I.

The results of these foam preparations are given in the following Table X.

TABLE X

| Example | 21 | 22 | 23 | 24 |
|---|---|---|---|---|
| Surfactant | A | B | C | D |
| Rise, inches | 6.7 | 6.6 | 6.0 | 6.7 |
| Breathability, SCFM | 1.85 | 4.6 | 4.5 | 4.0 |
| Burning extent, inches | 2.05 | 3.28 | 2.12 | 3.73 |
| Burning time, seconds | 51.8 | 71.7 | 52.0 | 84.7 |

As indicated by the results of these examples, samples of the flexible polyether urethane foams produced with tris(2,3-dichloropropyl)phosphate as the flame-retardant and stabilized with the sulfolanyloxypropyl-modified copolymers of the invention, had burning extents of less than 4 inches and as low as about 2.1 inches. Although not run as a control with this series of foam preparations, it is noted that, when the above-described unmodified polymethylsiloxanepoly(oxyethylene-oxypropylene) copolymer, referred to herein as Surfactant AA, is employed as the foam stabilizing component of Foam Formulation C, also at 0.6 part per 100 parts of polyol, samples of the foam products have substantially higher average burning extents (e.g., about 6 inches).

EXAMPLE 25

This example describes an illustrative sulfolanyloxypropyl-modified polymethylsiloxane-polyoxyethylene copolymer of the invention, designated herein as Surfactant E, having particular utility in forming flexible polyester urethane foam including foam produced with a flame-retardant.

A. Preparation of Si-H Reactant

To a one-liter capacity, three-necked reaction flask fitted with a mechanical stirrer, thermometer and nitrogen blow-by, the following reactants and catalyst were added: (1) hexamethyldisiloxane in an amount of 64.95 grams (0.4 mole), corresponding to 0.8 mole of $Me_3SiO_{1/2}$; (2) cyclic dimethylsiloxane tetramer in an amount of 148.3 grams, corresponding to 2 moles of $Me_2SiO_{2/2}$; (3) polymeric methylsiloxane hydride in an amount of 288.6 grams, corresponding to 4.8 moles of $Me(H)SiO_{2/2}$; and (4) concentrated sulfuric acid catalyst in an amount of 6 grams. The reaction mixture was stirred at room temperature for about 24 hours. The equilibrated reaction mixture was then neutralized with excess sodium bicarbonate and, after stirring for 1 hour, the product was pressure filtered. Based upon the relative proportions of reactants (1)-(3), normalized to two moles of $Me_3SiO_{1/2}$, the average composition of the equilibrated polymethylsiloxane hydride is:

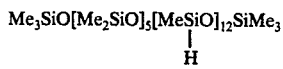

and the theoretical Me(H)SiO content is 57.5 weight percent. Analysis of the product for silanic hydrogen provided 212 cc. $H_2$/gram, corresponding to a found Me(H)SiO content of 56.8 weight percent.

B. Preparation of Surfactant E

In this preparation, a reaction flask fitted with a mechanical stirrer, thermometer, nitrogen blow-by, distillation head and receiver, was charged with:

(1) The equilibrated trimethylsiloxy-endblocked polymethylsiloxane hydride prepared as described under part (A) of this example, in an amount of 20.9 grams (0.017 mole), corresponding to 0.2 mole-equivalent of Me(H)SiO.

(2) Allyloxysulfolane in an amount of 18.3 grams (0.104 mole); and (3) An allyl alcohol-started, methyl-capped polyoxyethylene ether having an allyl content of 9.8 weight percent on the basis of which the average molecular weight is about 418 and the average composition is taken as $CH_2=CHCH_2(OC_2H_4)_{7.8}OMe$. This polyether was used in an amount of 60.4 grams (about 0.145 mole).

The respective amounts of reactants (2) and (3) include about 25 mole percent in excess of the desired stoichiometric reaction which was to effect reaction of (2) and (3) with the Si—H content of reactant (1) in a mole ratio of 5:7, respectively. After the addition of toluene (50 ml.), the reaction mixture was stirred and heated to 77° C. followed by the addition of 0.2 ml. of reduced platinum catalyst solution. The reaction mixture was heated (93°–113° C.) and recatalyzed four times over a period of about 3 hours, and was then stirred overnight at room temperature. At the end of this period, residual Si—H had been reduced to 0.5 cc. of hydrogen per 0.5 ml. of sample. The reaction product was neutralized with sodium bicarbonate, treated with filter aid and activated charcoal, followed by pressure filtration and vacuum stripping. The liquid product (94.2 grams) comprises a 3-(sulfolan-3-yloxy)propyl-substituted polyoxyethylene copolymer which, on the basis of the average composition of Si—H reactant (1) and the aforesaid desired stoichiometry, is assigned the average composition,

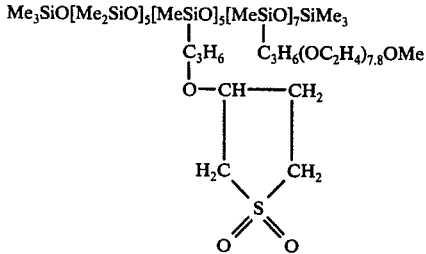

The product of this example is referred to herein as Surfactant E.

EXAMPLE 26

In accordance with this example, flexible polyester polyol-based urethane foam containing a flame-retardant was prepared employing Surfactant E of example 25 as the foam stabilizer. The composition of the urethaneforming reaction mixture (Foam Formulation D) was as follows:

TABLE XI

| FOAM FORMULATION D | |
|---|---|
| Component | Parts By Weight |
| Surfactant E | 0.35 |
| Polyester Polyol[1] | 100 |
| N-ethylmorpholine | 1.9 |
| Hexadecyldimethylamine | 0.3 |
| Water | 3.6 |
| Tolylene diisocyanate (Index 105)[2] | 45 |
| Tris(2-chloroethyl)phosphate | 7.0 |

[1]The polyester polyol employed was a commercially available polyester resin produced from adipic acid, diethylene glycol and trimethylol propane in a mole ratio of approximately 1:1:0.2. This polyester has a hydroxyl number of about 50 to 56, a molecular weight of about 2,000, an acid number not greater than 2 and a viscosity of about 17,000 centistokes at about 25° C. This particular polyester is known as "Witco Fomrez No. 50"(Witco Chemical Corporation).
[2]As defined in footnote 1 of Table I herein.

The foam was prepared in accordance with the following procedure: The surfactant, amine catalysts and water were premixed in a 50 milliliter beaker. The polyester polyol reactant was weighed into a tared 32-ounce capacity container. The flame-retardant [tris(2-chloroethyl)phosphate] and tolylene diisocyanate reactant were also weighed into the container and mixed with a spatula until homogeneous. Further mixing was done on a drill press equipped with a double three-bladed marine-type propeller about three inches in diameter. The mixing in the drill press was accomplished at 1000 revolutions per minute for 8 seconds. Then the premixture of surfactant, catalyst and water was added and mixing was continued for seven additional seconds. The reaction mixture was poured into a 12 × 12 × 12 in. cardboard box, was allowed to rise and was then cured for about 30 minutes at 130° C. Samples of the foam product were prepared for physical and flammability property determinations.

A control foam (Run K-7) was also formed employing the components of Foam Formulation D and the above procedure except that in place of Surfactant E of the invention, the foam stabilizing component, referred to herein as Surfactant BB, was of the type described in U.S. Pat. No. 3,793,360 and two divisions thereof, namely, U.S. Pat. Nos. 3,793,300 and 3,833,512. Surfactant BB, which is an excellent stabilizer of flexible polyester urethane foam produced with a flame-retardant, is constituted of:

(a) 52 weight percent of an organosilicone polymer containing $Me_3SiO_{1/2}$, $C_6H_5CH_2O(C_2H_4O)_{7.7}C_3H_6Si(Me)O_{2/2}$ and $SiO_{4/2}$ units in a mole ratio of 1:1:0.9, respectively;

(b) 10.4 weight percent of a non ionic organic surfactant in which the hydrophobe is a mixture of $C_{11-15}$ alcohols and the hydrophile is ethylene oxide, the average number of oxyethylene units per mole of hydrophobe being nine;

(c) 15.6 weight percent of tall oil; and (d) 21 weight percent of hexylene glycol.

In the control run, the relative proportions of ingredients of Foam Formulation D were as given in Table XI except that Surfactant BB was present in an amount of one part per 100 parts by weight of the polyester polyol reactant, corresponding to 0.52 part of organosilicone polymeric component (a).

The results of these foam preparations are given in the following Table XII.

TABLE XII

| Example | — | 26 |
|---|---|---|
| Control Run | K-7 | — |
| Surfactant | BB[1] | E[2] |
| Rise, inches | 6.0 | 5.5 |
| Breathability, SCFM | 1.5 | 0.7 |
| CPI | 45/50 | 45/50 |
| Density, lbs./ft.$^3$ | 1.91 | 2.09 |
| Burning extent, inches | 2.2 | 1.1 |
| Burning time, seconds | 48 | 27 |

[1]Not a surfactant of the invention.
[2]As described under example 25.

From the data of Table XII it is evident that the sulfolanylbearing polymethylsiloxane-polyoxyethylene copolymers encompassed by the present invention, as illustrated by Surfactant E, allow for the formation of flame-retardant containing flexible polyester urethane foam of low burning extent without the need to incorporate inorganic silicate units ($SiO_{4/2}$) into the polymer network as in the case of control Surfactant BB.

EXAMPLE 27

In this example, a potency determination was made of Surfactant E using non flame-retarded Foam Formulation E the composition of which is as follows:

TABLE XIII

FOAM FORMULATION E

| Component | Parts By Weight |
|---|---|
| Surfactant E | 0.35 |
| Polyester polyol[1] | 100 |
| N-ethylmorpholine | 1.9 |
| Hexadecyldimethylamine | 0.3 |
| Water | 5.0 |
| Tolylene diisocyanate[2] | 59.4 |

[1]As defined in footnote 1 of Table XI.
[2]As defined in footnote 1 of Table I.

A control foam (Run K-8) was also prepared employing above-identified Surfactant BB in a concentration of one part by weight per 100 parts of polyester polyol, corresponding to 0.52 p.p.h.p. of the organosilicone component thereof. The foams were prepared substantially following the foaming procedure described above under example 26, except that no flame-retardant was used. The results are given in Table XIV which follows.

TABLE XIV

| Example | — | 27 |
|---|---|---|
| Control Run | K-8 | — |
| Surfactant | BB[1] | E[2] |
| Rise, inches | 8.9 | 8.9 |
| Breathability, SCFM | 1.0 | 0.6 |
| Density, lbs./ft.$^3$ | 1.42 | 1.33 |
| CPI | 40/45 | 30/35 |
| Top Collapse, inches | None | None |

[1]Not a surfactant of the invention.
[2]As described under example 25.

The results of Table XIV demonstrate that illustrative Surfactant E of the invention also has excellent potency as a stabilizer of non flame-retarded polyester urethane foam.

What is claimed is:

1. A process for producing polyurethane foam which comprises reacting and foaming a reaction mixture containing: (a) an organic polyol reactant comprising a polyether polyol or a polyester polyol having an average of at least two hydroxyl groups per molecule; (b) an organic polyisocyanate reactant having at least two isocyanato groups per molecule; (c) a blowing agent; (d) a catalyst comprising an amine; and (e) a foam stabilizer comprising a polysiloxanepolyoxyalkylene copolymer having the average composition,

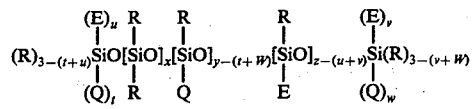

wherein: R is alkyl having from one to ten carbon atoms; each of $t$, $u$, $v$, $w$, the sum $t+u$ and the sum $v+w$ is independently zero or one, and each of the sums $t+w$ and $u+v$ is independently zero, one or two; Q is a sulfolanyloxyalkyl group having the formula,

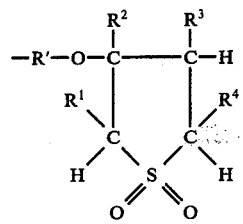

where —R'— is a bivalent alkylene group having from two to eight carbon atoms, and $R^1$, $R^2$, $R^3$ and $R^4$ are independently hydrogen or alkyl having from one to four carbon atoms;

and, when reactant (a) comprises a polyether polyol, $x$ has an average value from about 10 to about 200, $y$ has an average value from about 2 to about 100, $z$ has an average value from about 2 to about 30, and E is a polyoxyalkylene block the average polyoxyalkylene content of which is constituted of from about 20 to about 75 weight percent of oxyethylene units; and, when reactant (a) comprises a polyester polyol, $x$ is zero or a positive number having an average value up to about 20, $y$ has an average value from about 2 to about 20, $z$ has an average value from about 2 to about 30, and E is a polyoxyalkylene block the average polyoxyalkylene content of which is constituted of at least 75 weight percent oxyethylene units.

2. A process as defined in claim 1 in which said reaction mixture contains an organic flame-retardant as an additional component thereof.

3. A flame-retardant-containing flexible polyurethane foam produced by the process of claim 2.

4. A process for producing polyurethane foam which comprises simultaneously reacting and foaming a reaction mixture containing: (a) an organic polyol reactant comprising a polyether polyol having an average of at least two hydroxyl groups per molecule; (b) an organic polyisocyanate reactant containing at least two isocyanato groups per molecule; (c) water as a source of blowing action; (d) a catalyst comprising a tertiary-amine; and (e) a foam stabilizer comprising a polysiloxane-poly(oxyethylene-oxypropylene) copolymer having the average composition,

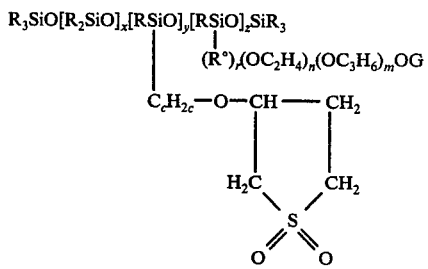

wherein: R is alkyl having from one to four carbon atoms; c is an integer having a value from 2 to 6; R° comprises a bivalent alkylene group of from 2 to 6 carbon atoms a carbon atom of which is bonded to silicon; G is an organic cap; r is zero or one; x has an average value from about 10 to about 200, y has an average value from about 2 to about 100, and z has an average value from about 2 to about 30, provided an average of from about 50 to about 85 weight percent of said copolymer is constituted of said —(R°)$_r$(OC$_2$H$_4$)$_n$(OC$_3$H$_6$)$_m$OG blocks; and m and n are numbers such that the average molecular weight of the chain, —(OC$_2$H$_4$)$_n$(OC$_3$H$_6$)$_m$—, is from about 1000 to about 6000 and from about 20 to about 65 weight percent of the chain is constituted of oxyethylene.

5. A process for producing polyether-based polyurethane foam containing a flame-retardant which comprises simultaneously reacting and foaming a reaction mixture containing: (a) a polyether polyol reactant containing an average of at least two hydroxyl groups per molecule; (b) an organic polyisocyanate reactant containing at least two isocyanato groups per molecule; (c) water as a source of blowing action; (d) a catalyst comprising a tertiary-amine; (e) a flame-retarding agent; and (f) a foam stabilizer comprising a sulfolanyloxypropyl-substituted polymethylsiloxane-poly(oxyethylene-oxypropylene) copolymer having the average composition, pr

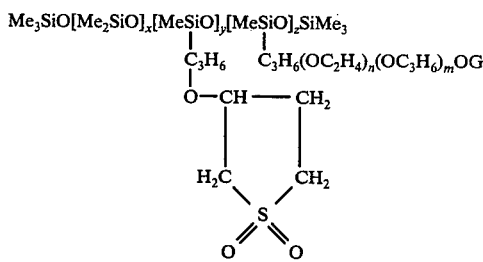

wherein: Me is methyl; G comprises a monovalent hydrocarbon group having from 1 to 12 carbon atoms; x has an average value from about 20 to about 100, y has an average value from about 2 to about 20, and z has an average value from about 2 to about 10, provided the average weight of said copolymers attributable to said —C$_3$H$_6$(OC$_2$H$_4$)$_n$(OC$_3$H$_6$)$_m$OG groupings is from about 50 to about 85 weight percent; and m and n are numbers such that the average molecular weight of the chain, —(OC$_2$H$_4$)$_n$(OC$_3$H$_6$)$_m$—, is from about 1000 to about 6000 and from about 20 to about 65 weight percent of said chain is constituted of oxyethylene.

6. A flame-retardant-containing polyurethane foam produced by the process of claim 5.

7. A process for producing polyurethane foam which comprises simultaneously reacting and foaming a reaction mixture containing: (a) a polyester polyol reactant containing an average of at least two hydroxyl groups per molecule; (b) an organic polyisocyanate reactant containing at least two isocyanato groups per molecule; (c) water as a source of blowing action; (d) a catalyst comprising a tertiary-amine; and (e) a foam stabilizer comprising a polysiloxane-polyoxyethylene copolymer having the average composition,

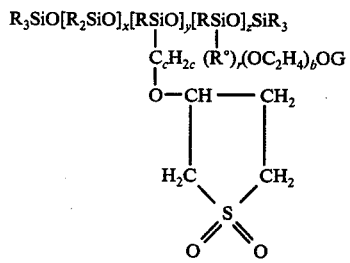

wherein: R is alkyl having from one to four carbon atoms; c is an integer having a value from 2 to 6; R° comprises a bivalent alkylene group of from 2 to 6 carbon atoms a carbon atom of which is bonded to silicon; G is an organic cap; r is zero or one; b has an average value from about 3 to about 30; x is zero or a positive number having an average value up to about 20; y has an average value from about 2 to about 20; and z has an average value from about 2 to about 30.

8. A process for producing polyester-based polyurethane foam containing a flame-retardant which comprises simultaneously reacting and foaming a reaction mixture containing: (a) a polyester polyol reactant containing an average of at least two hydroxyl groups per molecule; (b) an organic polyisocyanate reactant containing at least two isocyanato groups per molecule; (c) water as a source of blowing action; (d) a catalyst comprising a tertiary-amine; (e) a flame-retarding agent; and (f) a foam stabilizer comprising a sulfolanyloxypropyl-substituted polymethylsiloxane-polyoxyethylene copolymer having the average composition,

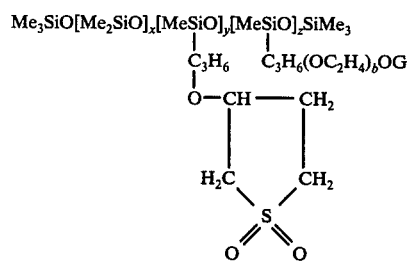

wherein: Me is methyl; G comprises a monovalent hydrocarbon group having from 1 to 12 carbon atoms; b has an average value from about 3 to about 30; x is zero or a positive number having an average value up to about 20; y has an average value from about 2 to about 20, and z has an average value from about 2 to about 30, provided the average weight of said copolymer attributable to —C$_3$H$_6$(OC$_2$H$_4$)$_b$OG is from about 50 to about 85 weight percent.

9. A process as defined in claim 8 in which x of said copolymer is a positive number.

10. A flame-retardant-containing polyurethane foam produced by the process of claim 8.

* * * * *

UNITED STATES PATENT AND TRADEMARK OFFICE
CERTIFICATE OF CORRECTION

PATENT NO. : 4,110,271
DATED : August 29, 1978
INVENTOR(S) : Bernard Kanner and Bela Prokai It is certified that error appears in the above-identified patent and that said Letters Patent are hereby corrected as shown below:

In the ABSTRACT, fifth from the last line thereof, for "oxyethlene" read -- oxyethylene --. Column 1, line 36, for "or" read -- of --; line 53, for "As" read -- An --. Column 19, line 59, for "0-200:214" read -- 0-200:2- --. Column 40, line 28, for "be" read -- by --. Column 44, line 35, for "cloroplatinic" read -- chloroplatinic --. Column 52, in the formula at lines 5-8, for the subscript reading "y-(t+W)" read -- y-(t+w) --, and for the subscript reading "3-(v+W)" read -- 3-(v+w) --. Column 53, line 42, delete "pr"; line 58, for "20," read -- 30, --.

Signed and Sealed this

Twenty-fourth Day of June 1980

[SEAL]

Attest:

SIDNEY A. DIAMOND

Attesting Officer     Commissioner of Patents and Trademarks